(12) United States Patent
Chung

(10) Patent No.: US 6,672,607 B2
(45) Date of Patent: Jan. 6, 2004

(54) MINI SCOOTER

(76) Inventor: Yuan-Fen Chung, 4F, No. 62, Yung Heng Road, Yungho, Taipei Hsien (TW)

( * ) Notice: Subject to any disclaimer, the term of this patent is extended or adjusted under 35 U.S.C. 154(b) by 13 days.

(21) Appl. No.: 10/145,200

(22) Filed: May 15, 2002

(65) Prior Publication Data

US 2003/0197344 A1 Oct. 23, 2003

(30) Foreign Application Priority Data

Apr. 23, 2002 (TW) ........................................ 91108315 A

(51) Int. Cl.⁷ ................................................ B62M 1/14
(52) U.S. Cl. ........................ 280/246; 280/244; 280/248
(58) Field of Search ............................. 280/242.1, 244, 280/246, 253, 255, 258, 248

(56) References Cited

U.S. PATENT DOCUMENTS

| | | | | |
|---|---|---|---|---|
| 1,309,855 A | * | 7/1919 | Johnson | 280/240 |
| 1,598,855 A | * | 9/1926 | Dunlop | 280/240 |
| 2,493,124 A | * | 1/1950 | Eskola | 280/246 |
| 6,179,307 B1 | * | 1/2001 | Mao | 280/87.041 |
| 6,375,208 B1 | * | 4/2002 | Lee | 280/245 |
| 6,616,163 B2 | * | 9/2003 | Lee | 280/245 |

* cited by examiner

Primary Examiner—Daniel G. DePumpo
(74) Attorney, Agent, or Firm—Troxell Law Office PLLC

(57) ABSTRACT

A mini scooter includes a wheel member, a wheel support member, a steering rod, a steering rod support, a wheel cover plate, and a pedal. The wheel member includes a wheel with a transmission ring in the center, and a unidirectional rotary bearing, a pivot shaft of which serves as a wheel axle. Two ends of the wheel axle are respectively provided with cover plates. The cover plates are connected to the transmission ring. The wheel support member includes a wheel support with a top portion having a through hole and having an inverted U-shaped cross section. Securing bolts extend through through holes in the wheel support and engage with nuts. Two ends of the bearing pivot shaft are provided with axle bearings. Two sides of the wheel support respectively form circular holes for receiving the axle bearings. The wheel cover plate is disposed on and secured to the securing bolts in the through holes in the wheel support. The wheel cover plate has a top portion provided with front and rear stop blocks. A rear end of the wheel cover plate is connected to the pedal. The steering rod support includes a steering rod upper support and two steering rod side supports connected to two ends of the wheel axle and disposed on outer sides of the wheel support. Two steering rod side supports are respectively connected to the steering rod upper support. The steering rod is secured on a top portion of the steering rod upper support at a middle position such that when the steering rod swings forward and rearward, the swinging angles are limited within a range defined by the front and rear stop blocks.

11 Claims, 28 Drawing Sheets

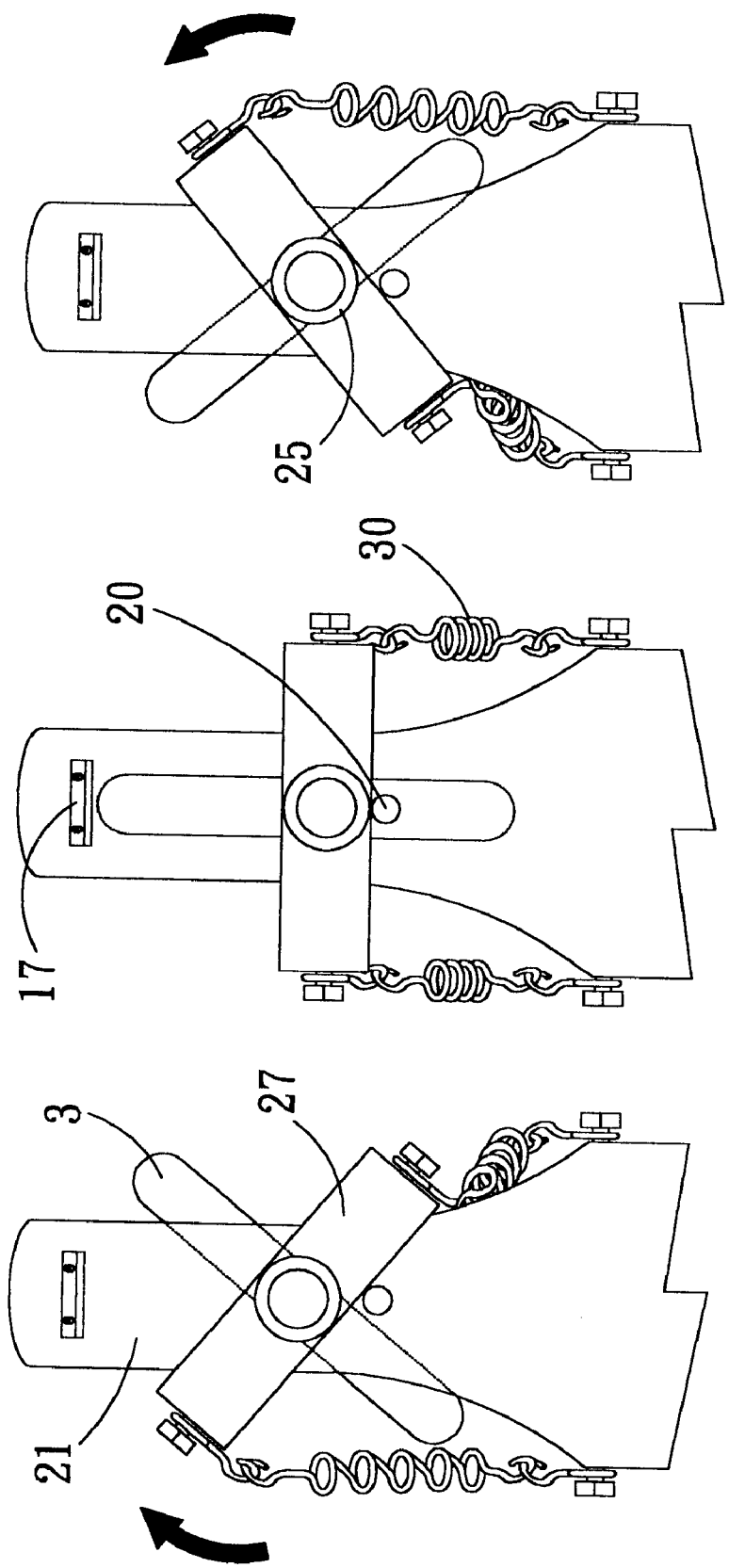

MINI SCOOTER

BACKGROUND OF THE INVENTION (a) Field of the Invention

The present invention relates to a mini scooter.

(b) Description of the Prior Art

In most of the conventional mini scooters, the user, who stands with one foot on the platform, propels the scooter forward with the other foot stamping on the ground surface intermittently. The counteraction produced due to friction between the user's foot and the ground surface drives the scooter along. In order to keep the scooter going, the user has to keep stepping on the ground surface. The steering rod of the scooter is provided mainly to enable the user to steer the scooter and to bear a part of the weight of the user.

As the user has to keep touching the ground surface with one foot, the conventional mini scooters are not suitable for use as a transportation means. Besides, to the user, long term use of the scooter may result in imbalance of the muscles and bones of his/her feet.

SUMMARY OF THE INVENTION

Therefore, the main object of the present invention is to provide a mini scooter that is propelled by virtue of forward and rearward swinging of a steering rod.

BRIEF DESCRIPTION OF THE DRAWINGS

The foregoing and other features and advantages of the present invention will be more clearly understood from the following detailed description and the accompanying drawings, in which.

FIGS. 21A, 21B and 21C are schematic top views of the invention when connecting type return springs are employed to rotate the wheel;

DETAILED DESCRIPTION OF THE PREFERRED EMBODIMENT

Figure 1:
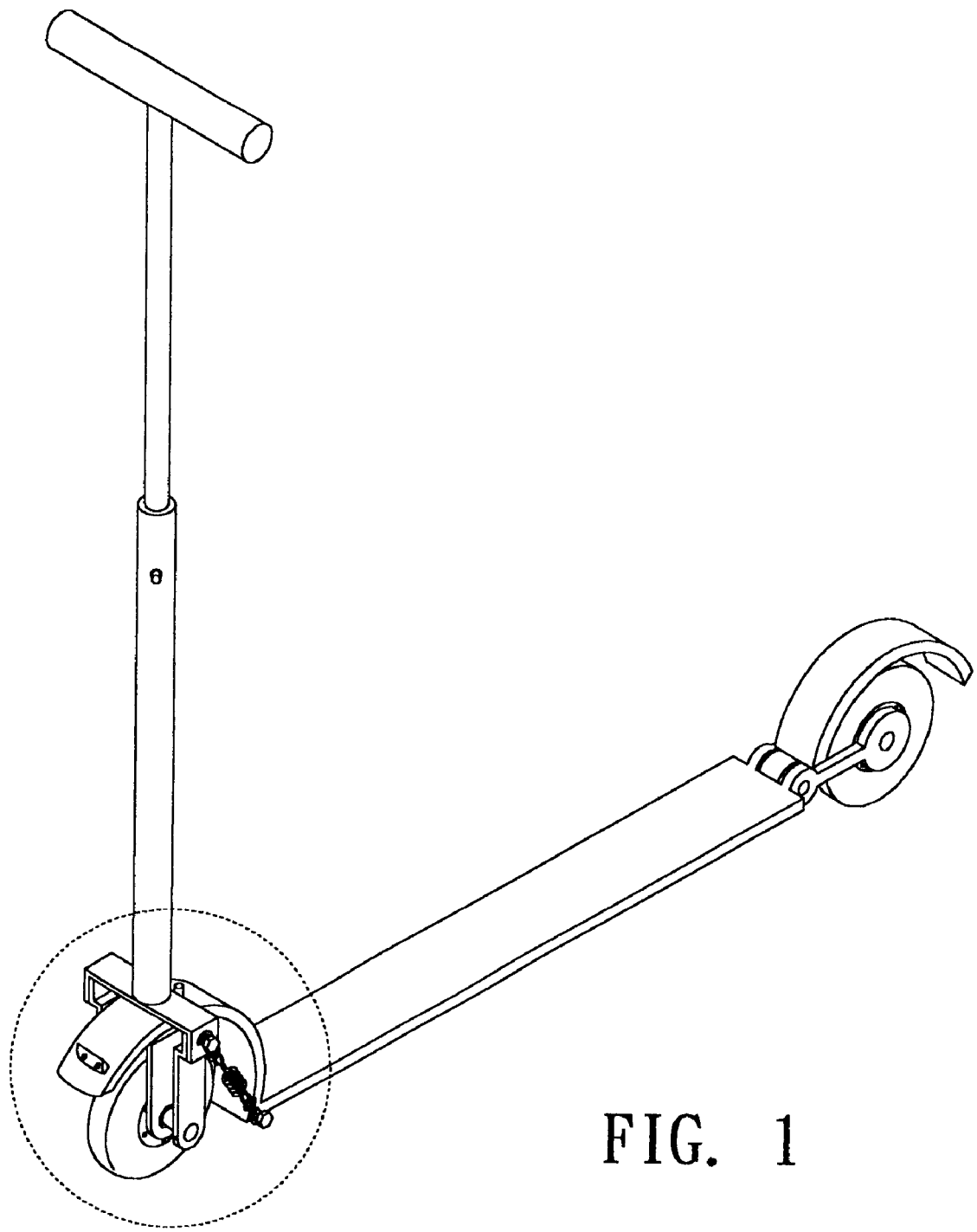
FIG. 1 is a schematic perspective view of the present invention.

With reference to the drawings, the mini scooter according to the invention includes a wheel member A, a wheel support member B, a steering rod 25, a steering rod support C, a wheel cover plate 21, and a platform 22.

As shown in FIGS. 1 to 8, the wheel member A includes a wheel 3 having a transmission ring 5 in the center thereof, a wheel axle 4 which is also a pivot shaft of a unidirectional rotary bearing, two cover plates fitted at both ends of the wheel axle 4 respectively. The cover plates 2 are coupled to the transmission ring 5 via securing bolts 1.

Figures 9, 10:
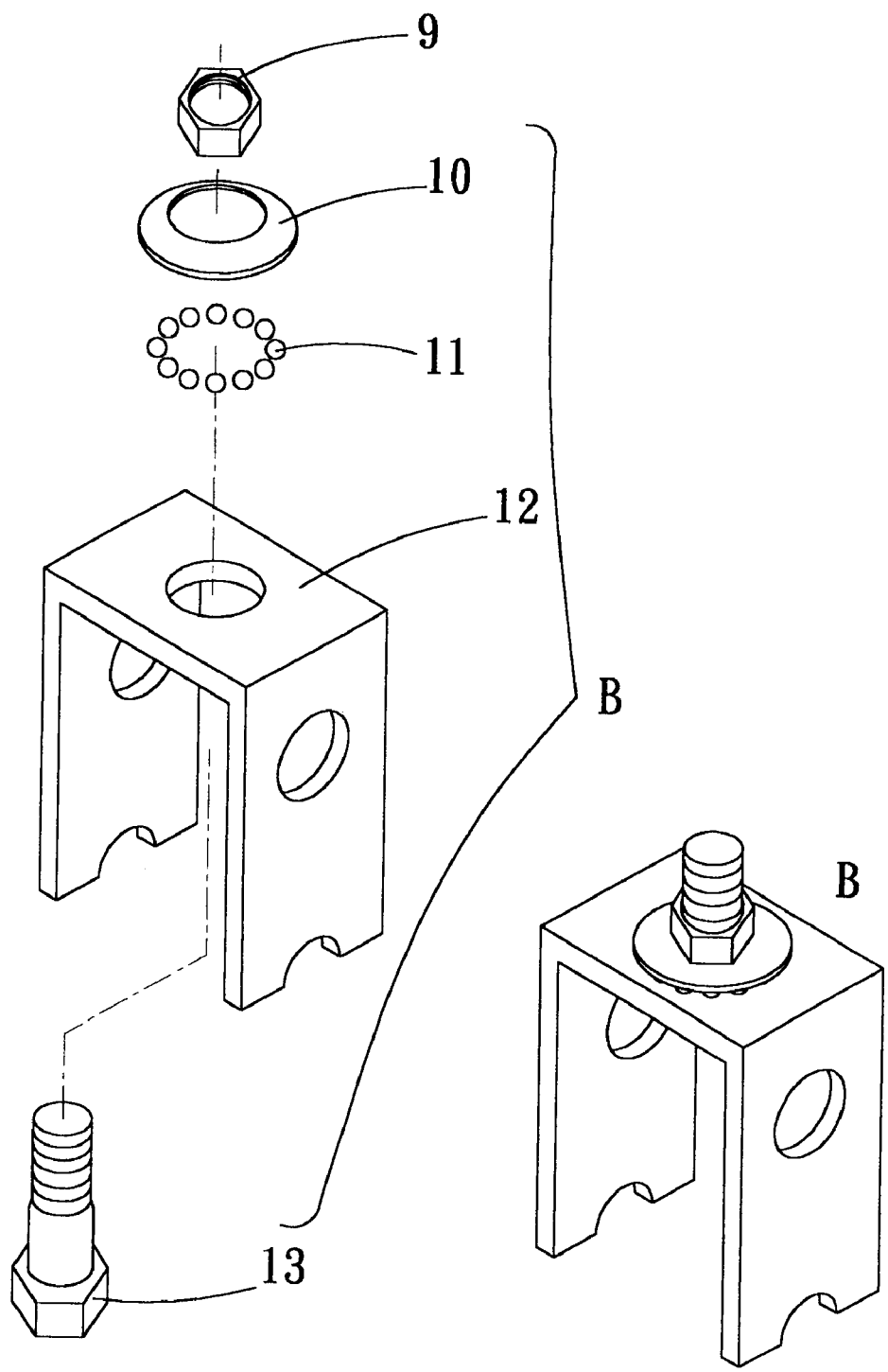
FIG. 9 is an exploded view of assembly of a wheel support of the invention.
FIG. 10 is an assembled perspective view of the wheel support of the invention.
Figure 11:
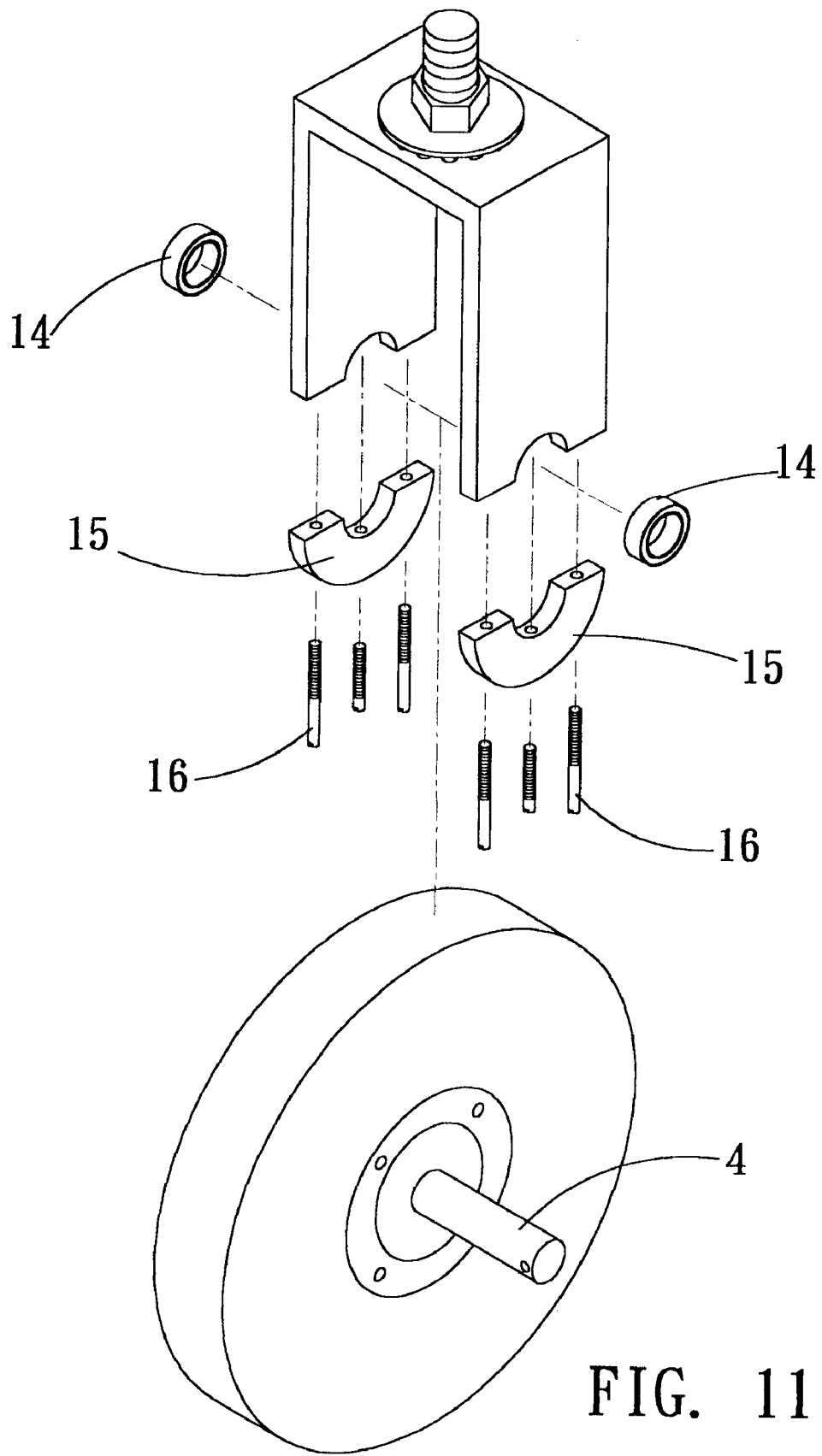
FIG. 11 is an exploded view of assembly of the wheel support and a wheel.
Figure 12:
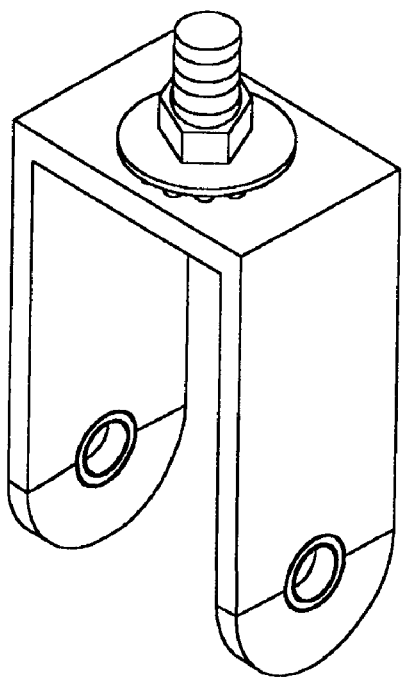
FIG. 12 is an assembled perspective view of the wheel support.
Figure 13:
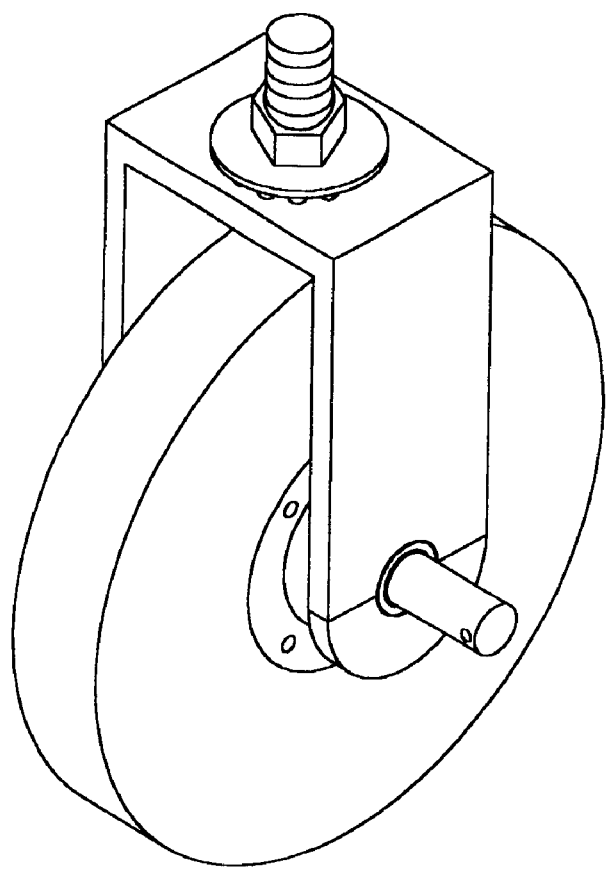
FIG. 13 is a perspective view of assembly of the wheel support of the invention and a wheel.

As shown in FIGS. 9 and 10, the wheel support member B includes a wheel support 12 having a through hole in its top portion and an inverted U-shaped cross section, a securing bolt 13 extending through the through hole in the wheel support 12, a balls 11 disposed between the through hole in the wheel support 12 and the securing bolt 13, a ball cover plate 10 sleeved on the securing bolt 13 and disposed above the wheel support 12, a nut 9 threadedly engaging the securing bolt 13 for coupling the wheel support 12, the balls 11 and the ball cover plate 10. As shown in FIGS. 11, 12 and 13, the bearing pivot shaft, i.e., the wheel axle 4, has two ends respectively provided with axle bearings 14. Two lateral bottom portions of the wheel support 12 are respectively provided with curved recesses. Two securing plates 15 with curved recesses are secured respectively to the lateral bottom portions via securing bolts 16. The curved recesses at the two lateral sides of the wheel support and the curved recesses on the securing plates together form circular holes for receiving the axle bearings 14, respectively.

Figure 14:
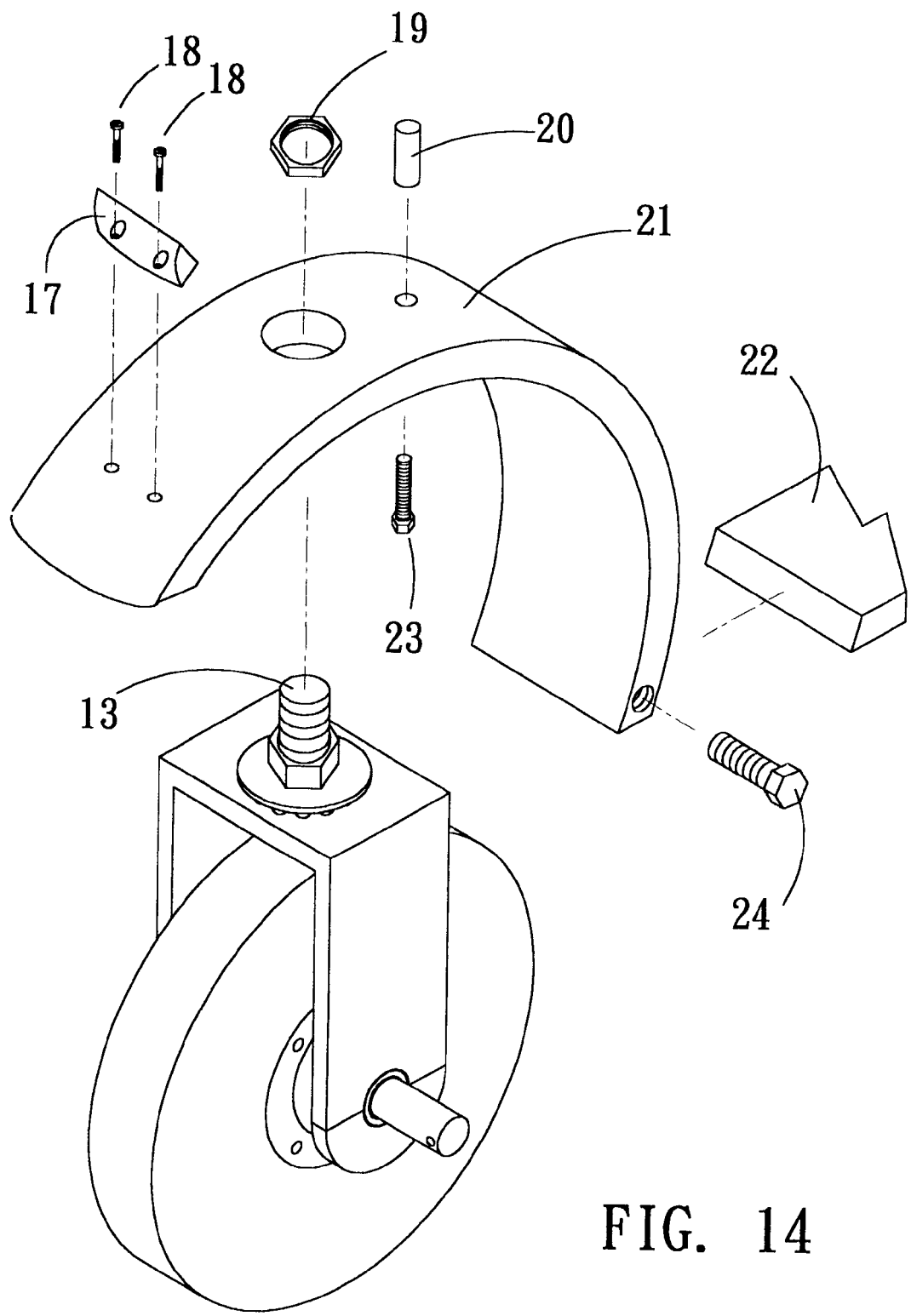
FIG. 14 is an exploded view of assembly of the wheel, a wheel cover plate and a platfoam of the mini scooter of the invention.
Figure 15:
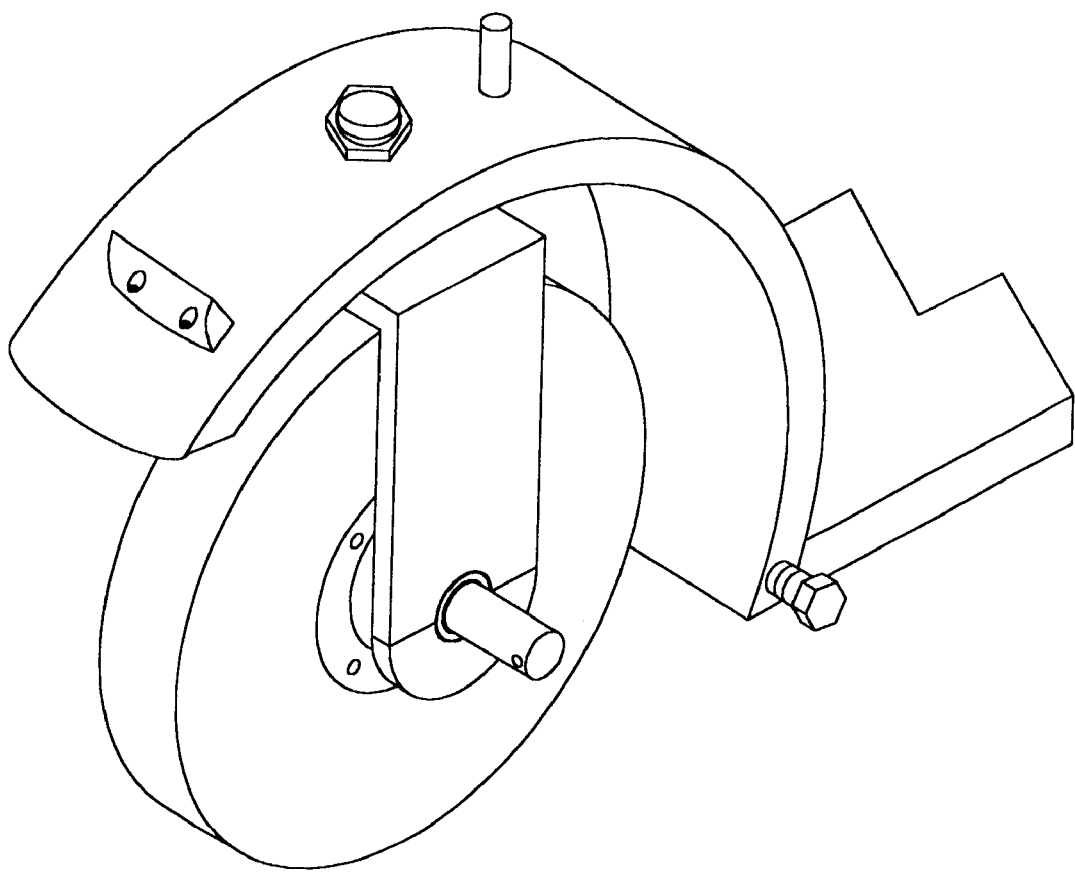
FIG. 15 is an assembled perspective view of the assembly of the wheel, the wheel cover plate and the platfoam of the mini scooter.

As shown in FIGS. 14 and 15, the wheel cover plate 21 is fitted on the securing bolt 13 in the through hole in the wheel support 12 and is secured via a nut 19. The top portion of the wheel cover plate 21 are provided with front and rear stop blocks 17, 20. The rear end of the wheel cover plate 21 is connected to the platform 22.

Figure 16:
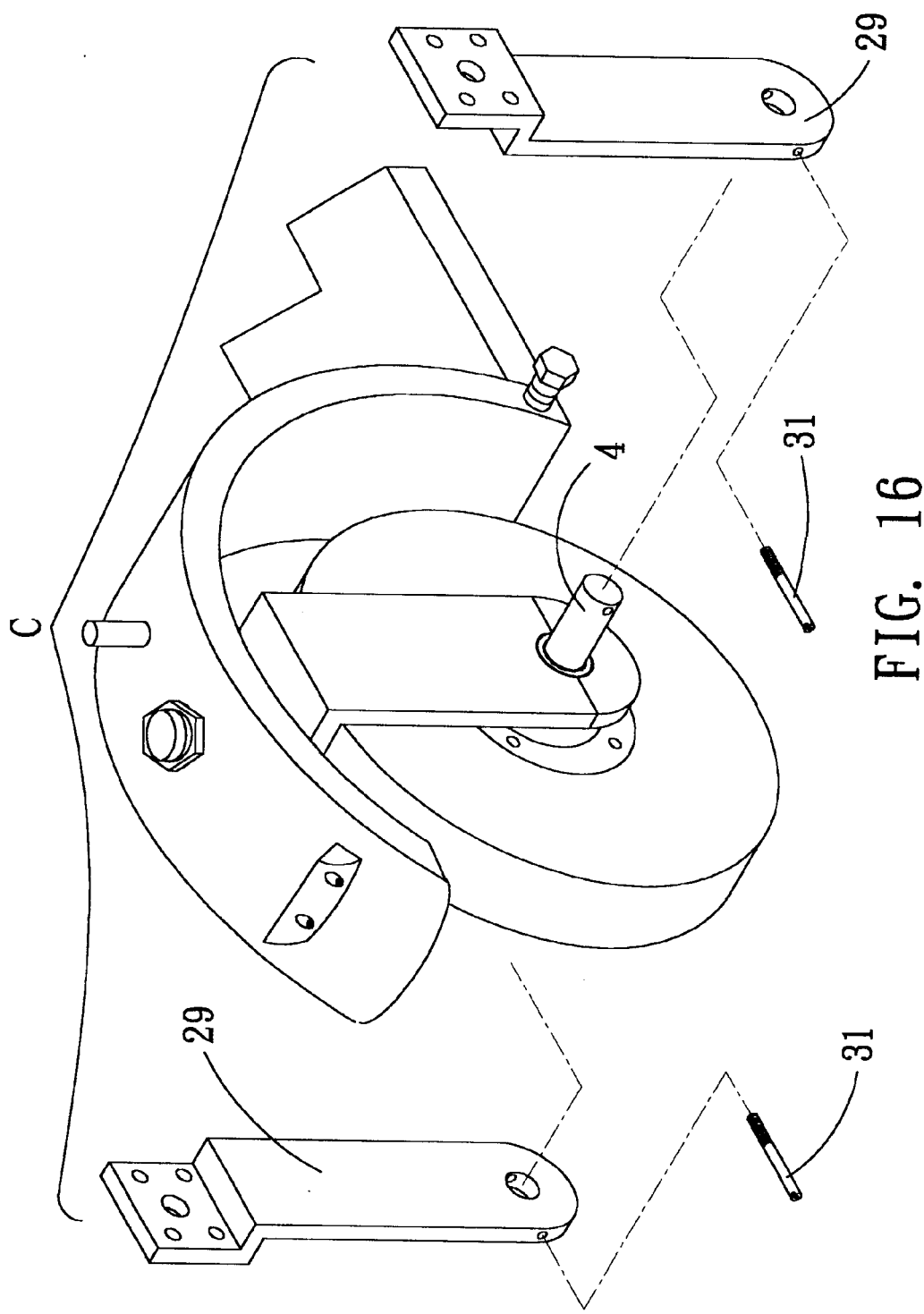
FIG. 16 is an exploded view of assembly of steering rod left and right side supports and a wheel axle.
Figure 17:
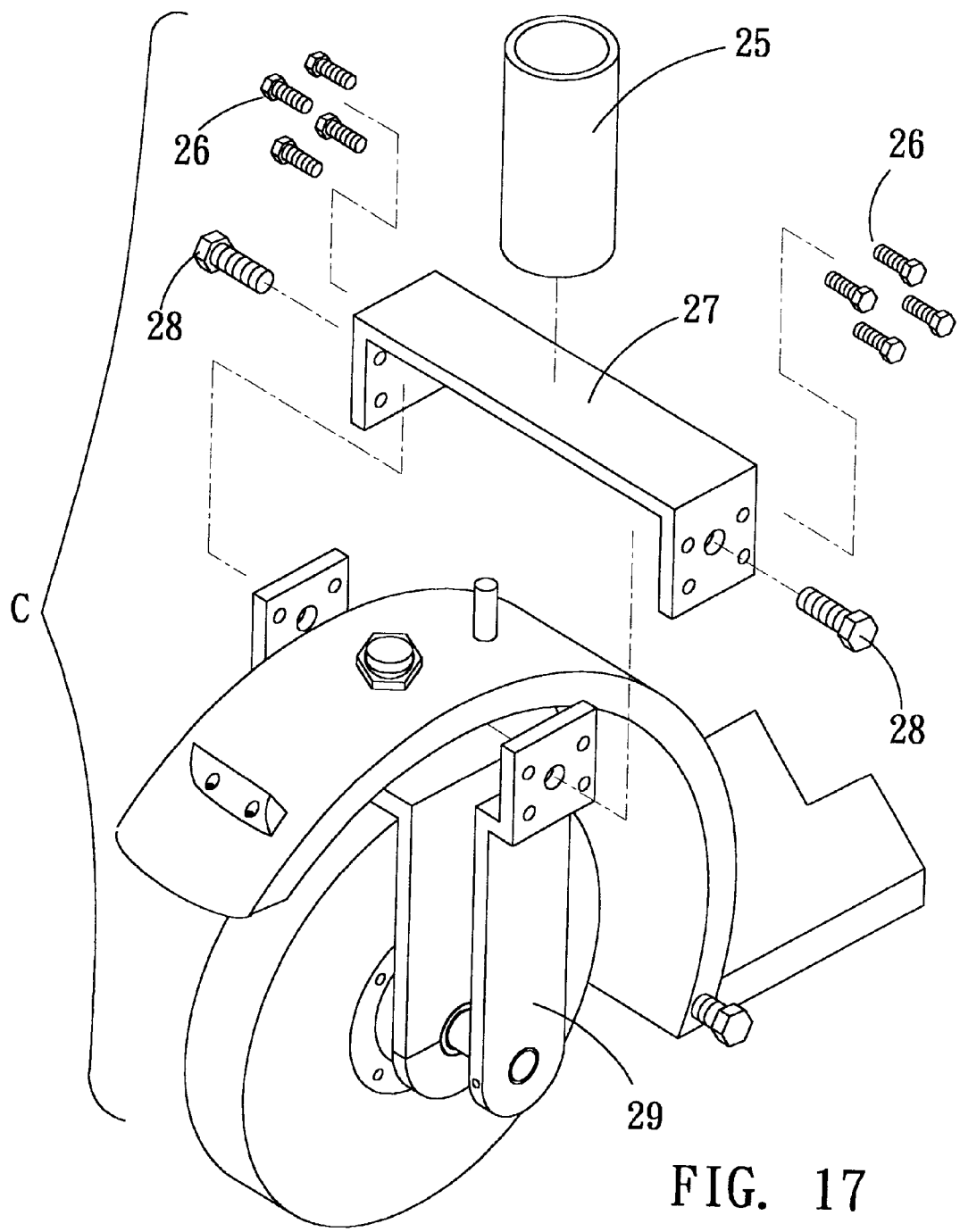
FIG. 17 is an exploded view of a final assembly of the invention.

As shown in FIGS. 16 and 17, the steering rod support C includes a steering rod upper support 27 and two steering rod side supports 29 connected to two ends of the wheel axle 4 and disposed on the outer sides of the wheel support 12. The two steering rod side supports 29 are respectively connected to the two ends of the steering rod upper support 27 via securing bolts 26.

Figure 18:
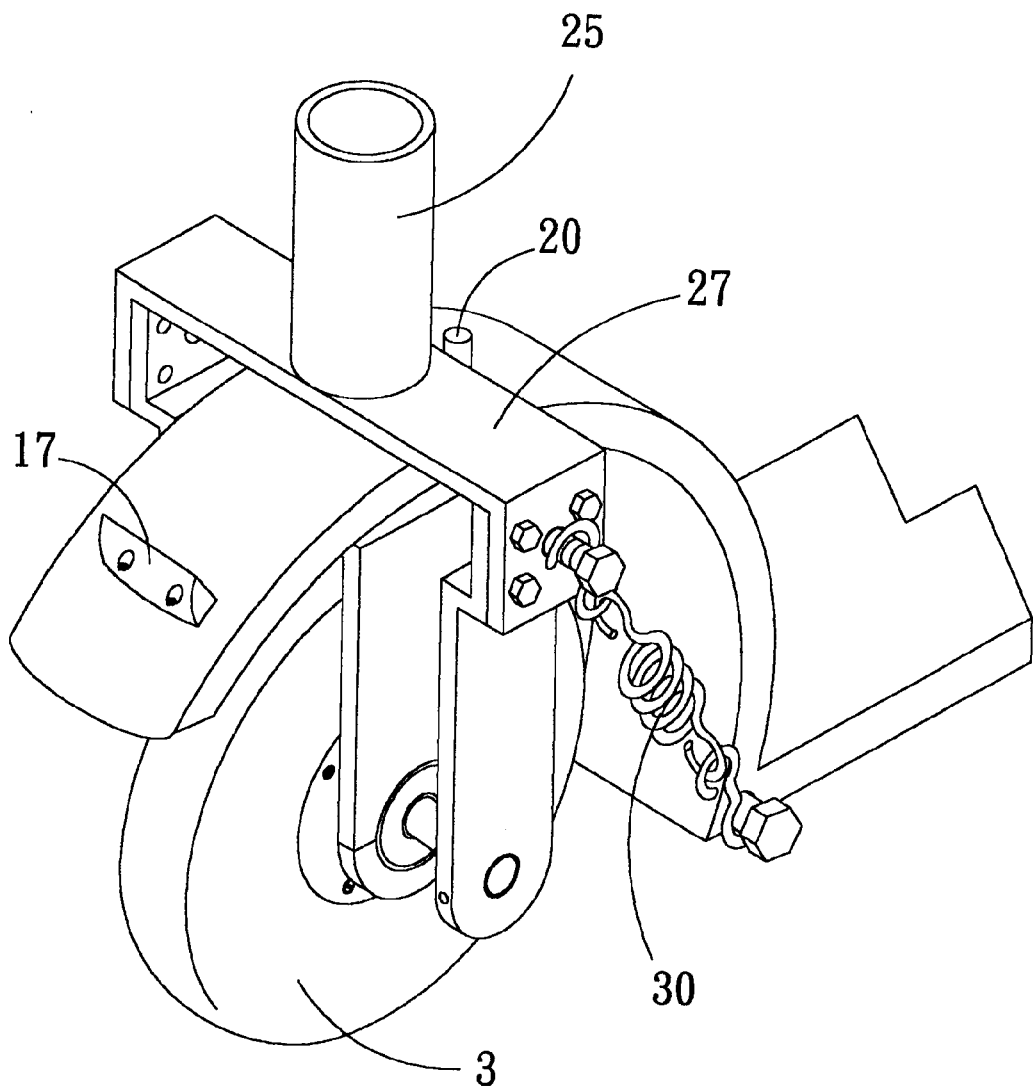
FIG. 18 is an assembled perspective view of the final assembly.
Figure 20:
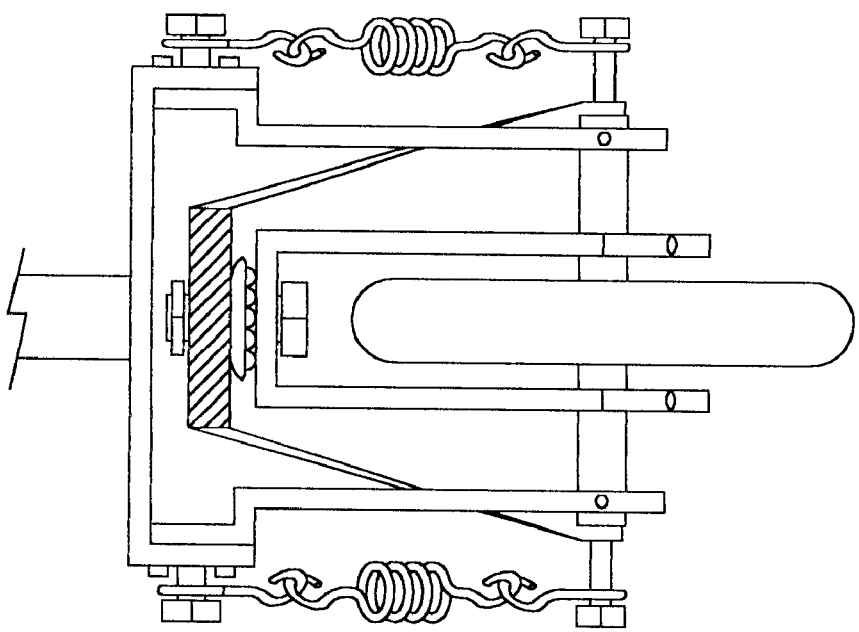
FIG. 20 is a front view of the final assembly.
Figure 19:
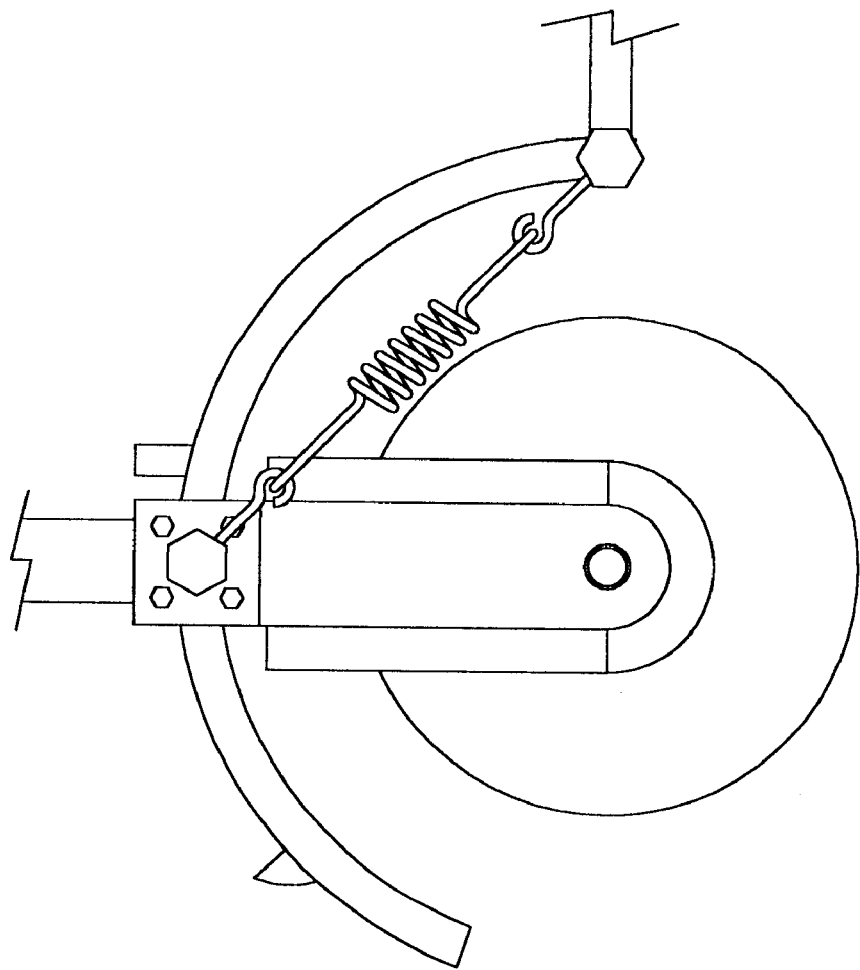
FIG. 19 is a side view of the final assembly.
Figure 22:
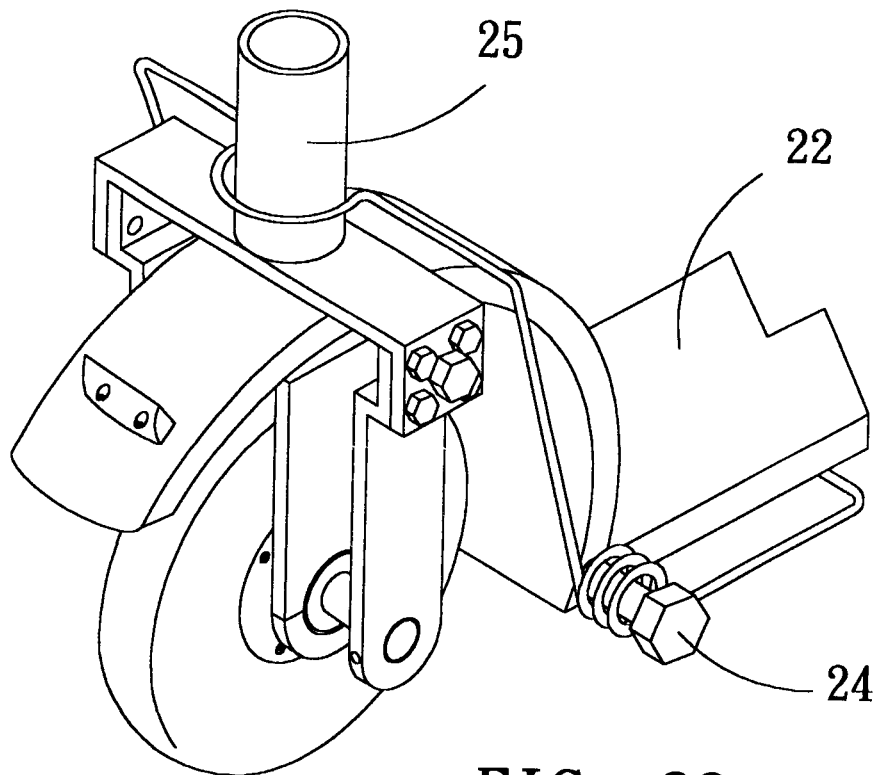
FIG. 22 is a perspective view showing the final assembly of the invention employing a linking type return spring.
Figure 23:
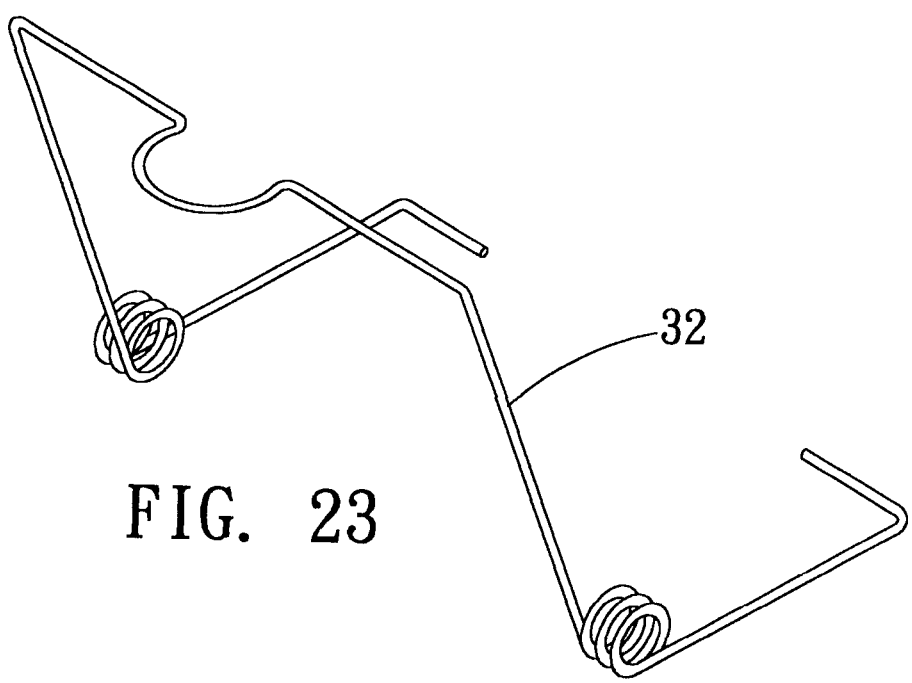
FIG. 23 is a perspective view of the linking type return spring of the invention.

As shown in FIG. 18, the steering rod 25 is secured at a middle position at the top portion of the steering rod upper support 27. When the steering rod 25 swings forward and rearward, the rotational angle is limited between the front and rear stop blocks 17, 21 of the cover plate.

The two steering rod side supports 29 are secured to the two ends of the wheel axle 4 via securing bolts 31.

Figure 2:
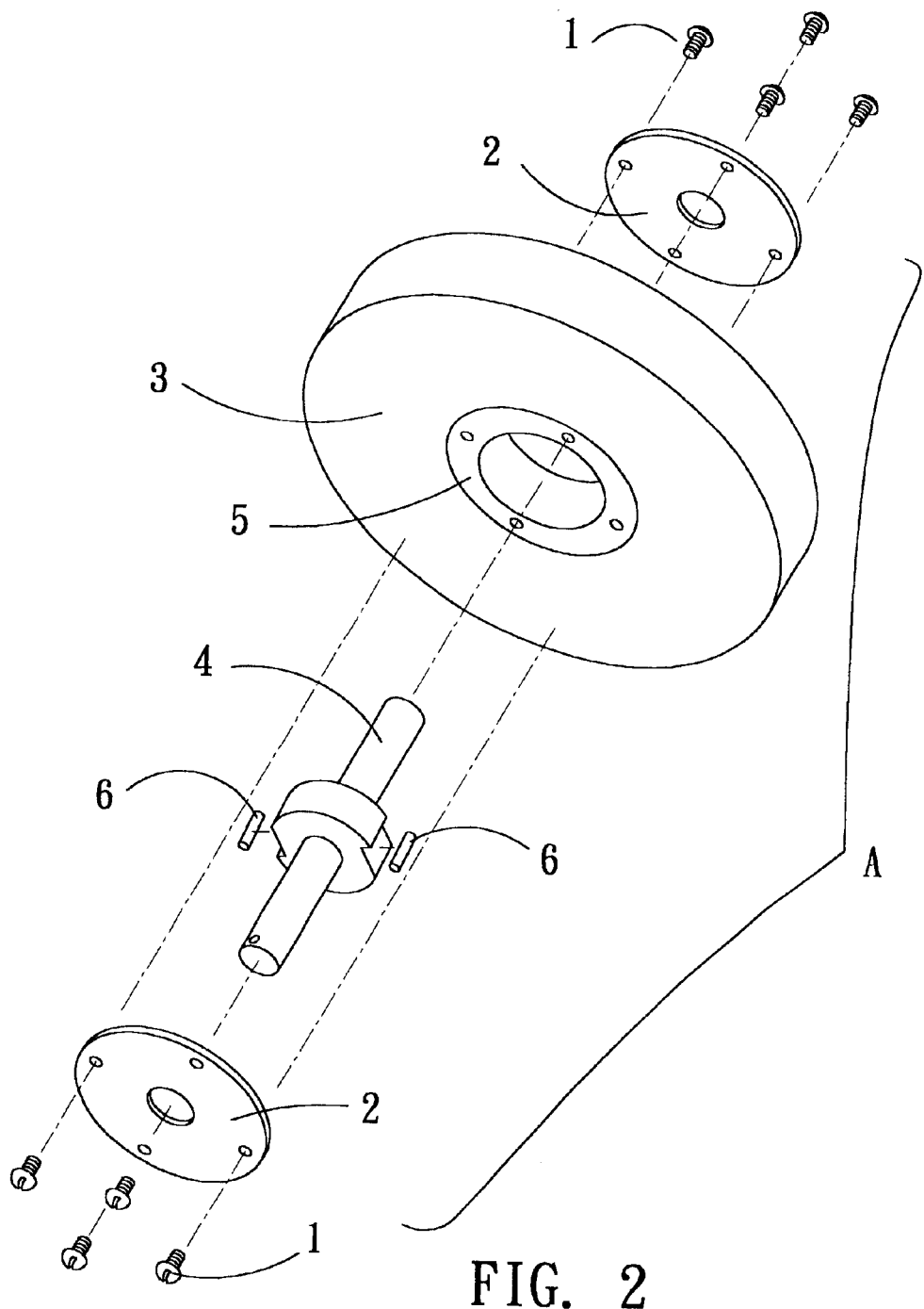
FIG. 2 is an exploded view of major components of a unidirectional rotary bearing body of the present invention.

As shown in FIG. 2, the bearing pivot shaft, i.e., the wheel axle 4, has a recess provided in the outer side of a central section thereof. The recess receives a rotary pin 6.

Figure 3:
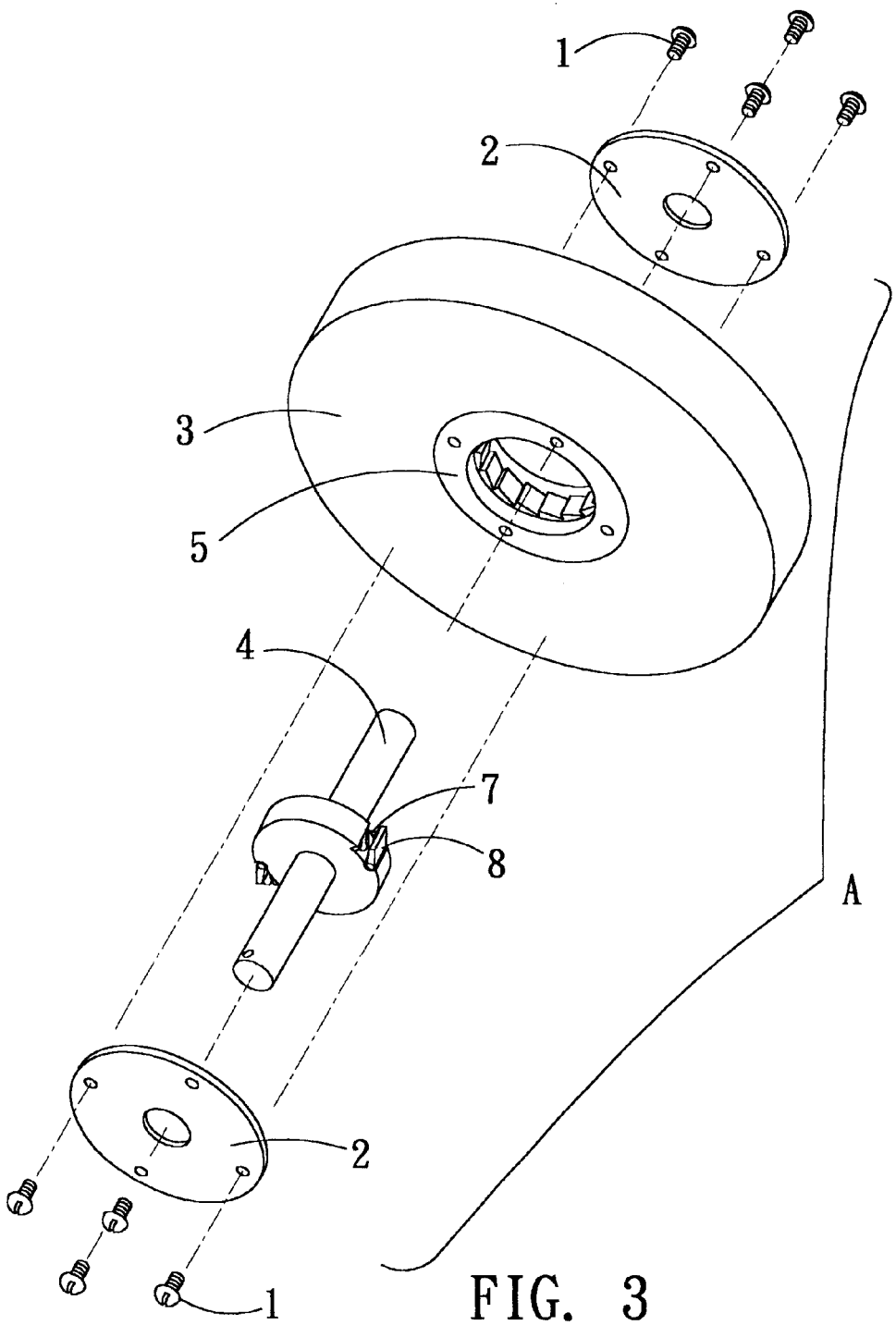
FIG. 3 is an exploded view of the major components of another unidirectional rotary bearing.

As shown in FIG. 3, the bearing pivot shaft, i.e., the wheel axle 4, has a groove provided in the outer side of the central section. The groove accommodates a spring 7 and a braking plate 8 therein. The transmission ring 5 has a serrated groove.

Figure 4:
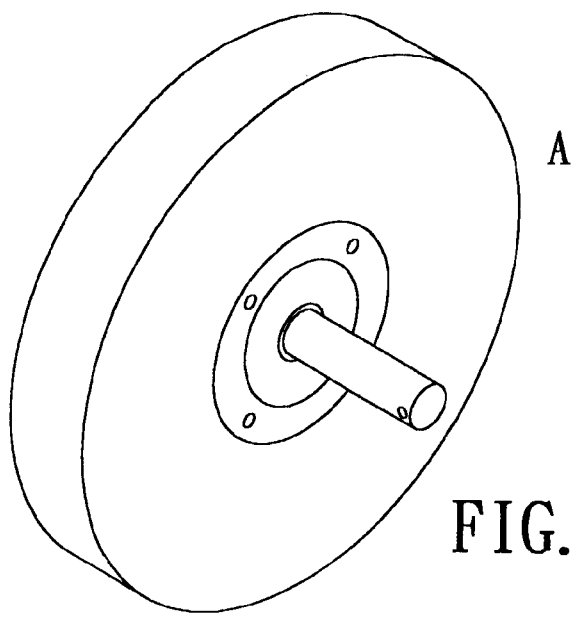
FIG. 4 is an assembled perspective view of the unidirectional rotary bearing body of the invention and a wheel.
Figure 5:
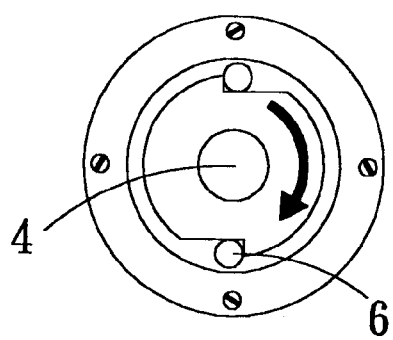
FIG. 5 is a schematic view illustrating clockwise rotation of the unidirectional rotary bearing body of the invention.
Figure 6:
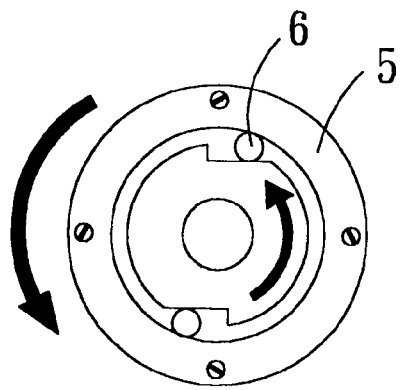
FIG. 6 is a schematic view illustrating that counterclockwise rotation of the unidirectional rotary bearing body of the invention drives a transmission ring to rotate therewith.
Figure 7:
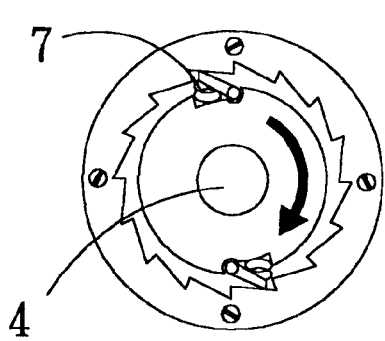
FIG. 7 is a schematic view illustrating clockwise rotation of another unidirectional rotary bearing body of the invention
Figure 8:
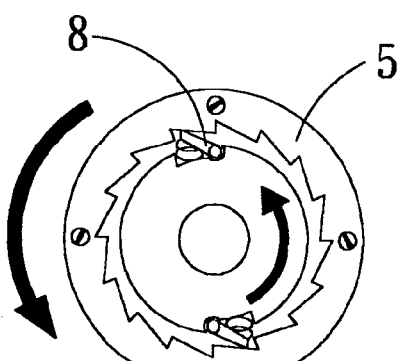
FIG. 8 is a schematic view illustrating counterclockwise rotation of another unidirectional rotary bearing body of the invention, which drives a transmission ring to rotate therewith.

During assembly, the wheel member A is first assembled. The rotary pin 6 is directly disposed in the recess in the unidirectional rotary bearing pivot shaft, i.e., the wheel axle 4, which is formed from an alloy by integral molding, riveting or welding, or the spring 7 and the braking plate 8 are disposed in the groove in the pivot shaft 4 (as shown in FIG. 3). Then, all of the above are disposed within the transmission ring 5 of the wheel 3, which is formed from a plastic material such as PU or rubber. The cover plates 2 are disposed at the two sides and the securing bolts 1 are fastened. The assembly is shown in FIG. 4. If the rotary pin 6 is used (as in FIG. 2), when the pivot shaft 4 rotates clockwise, the rotary pin 6 will fall into the pivot shaft recess and rotates (as shown in FIG. 5) and is unable to drive the transmission ring 5 with a smooth surface to rotate. When the pivot shaft 4 rotates counterclockwise, the rotary pin 6 will be retained on the transmission ring 5 and brings the same to synchronously rotate counterclockwise therewith (as shown in FIG. 6). If the braking plate 8 is used (as in FIG. 3), when the pivot shaft 4 rotates clockwise, the braking plate 8 will be pressed into the groove in the transmission ring 5 (as shown in FIG. 7) and is unable to drive the transmission ring 5 to rotate. When the pivot shaft 4 rotates counterclockwise, the braking plate 8 will be pushed outward by the spring 7 and retained on the serrated groove of the transmission ring 5 to drive the same to synchronously rotate counterclockwise therewith (as shown in FIG. 8).

Next, the wheel support member B is assembled. The unthreaded head portion of the securing bolt 13 which is also a bearing pivot shaft extends through the upper circular hole in the wheel support 12. The bearing balls 11 are then disposed in position, and the ball cover plate 10 is put in place. Then, the securing bolts 9 are fastened. Thus, the wheel support 12 can rotate about the bearing pivot shaft 13 by any angle. The assembly is shown in FIG. 10.

Subsequently, the wheel member A and the wheel support member B are assembled. As shown in FIGS. 11, 12 and 13, the pivot shaft, i.e., the wheel axle 4, at the two sides of the wheel member are fitted with the bearings 14 and disposed in the holes in the lower ends of the wheel support 12 in the wheel member A (as shown in FIG. 10). Then, the bearing outer ring securing plate 15 is disposed in place and is fastened by means of the bolts 16 (as shown in FIGS. 11 and 12). Thus, the wheel axle 4 and the wheel 3 is able to freely rotate on the wheel support 12. The assembly is shown in FIG. 13.

Lastly, the wheel cover plate 21 and the platform 22 are assembled (as shown in FIGS. 14 and 15). The front stop block 17 and the rear stop block 20 are respectively disposed on the wheel cover plate 21 and are respectively locked via front securing bolts 18 and a rear securing bolt 23. Then, the securing bolt 13 of the assembled wheel member A and the support member B (see FIG. 13) extends through the wheel cover plate 21 and is fastened via the securing nut 19. The rear end of the wheel cover plate 21 and the platform 22 are welded together or bolted. Then, the holes in the steering rod side supports 29 at the left and right sides are sleeved on the wheel shaft 4 and secured via securing bolts 31 (as shown in FIG. 16). When the steering rod side supports 29 reciprocatingly swing forward and rearward, the wheel axle 4 will be brought to rotate forward and rearward. Through the transmission of relevant structures of the unidirectional rotary bearing (as shown in FIGS. 2 and 3), the wheel 3 of the mini scooter will be brought to rotate only forwardly. As shown in FIG. 17, the steering rod 25 is locked or welded to the steering rod upper support 27, which is fitted to the left and right side supports 29 and locked via bolts 26. The steering rod upper support 27 is disposed between the front and rear stop blocks 17, 20. The front and rear stop blocks 17, 20 serve to limit the steering rod 25 during forward and rearward swinging movement thereof. This is because when the steering rod upper support 27 swings forward to a predetermined position, it will abut against the front stop block 17, and when the steering rod upper support 27 is pulled rearward to a predetermined position, it will abut against the rear stop block 20. Therefore, the front and rear blocks 17, 20 define the largest angle of forward and rearward swinging of the steering rod 25. In the mini scooter of the invention, since the forward and rearward swinging of the steering rod upper support 27 is limited between the front and rear stop blocks 17, 20, when the steering rod 25 swings forward by a certain angle, by virtue of the transmission of the unidirectional rotary bearing pivot shaft, i.e., the wheel axle 4, the transmission ring 5 and the wheel 3 will be caused to rotate within the same angle.

As shown in FIGS. 14 and 17, the two sides of the steering rod upper support 27 and the lateral bottom portions of the wheel cover plate 2 are respectively provided with securing bolts 28, 24. Two connecting type return springs 30 respectively engaging and pulling the securing bolts 28 at the two sides of the steering rod upper support and the securing bolts 24 at the lateral bottom portions of the wheel cover plate. When the steering rod 25 swings forward, the connecting type return springs 30 provides a rearward pulling predetermined force (as shown in FIGS. 18, 19, 20, 21A, 21B and 21C) so that it returns to its original position in front of the rear stop block 20 to facilitate the steering rod 25 to proceed with the next movement to drive the wheels of the mini scooter to rotate forward.

Figure 25:
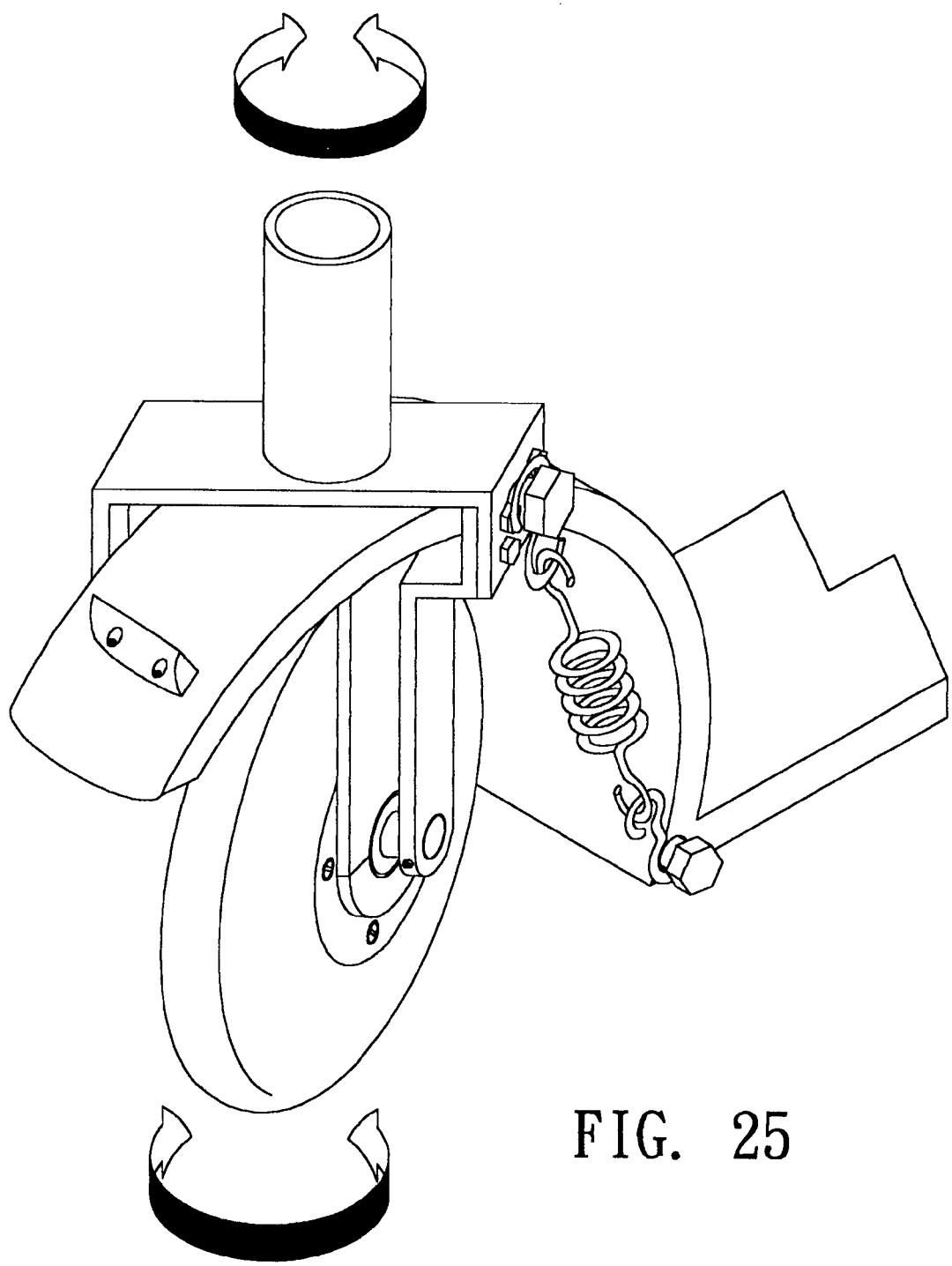
FIG. 25 is a schematic perspective view showing rotation of the wheel.
Figure 26:
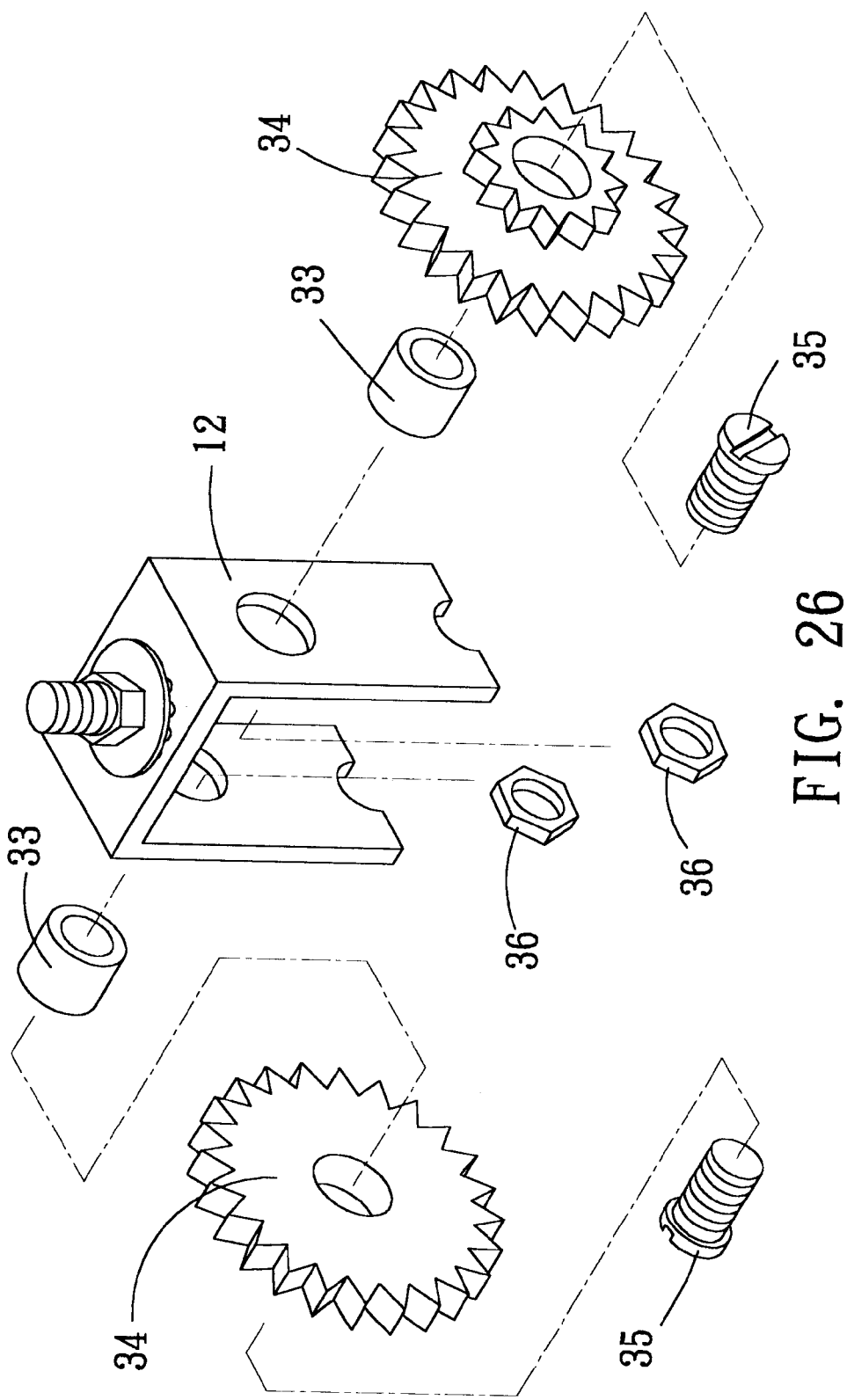
FIG. 26 is an exploded view of assembly of the wheel support and transmission gears of the invention.
Figure 27:
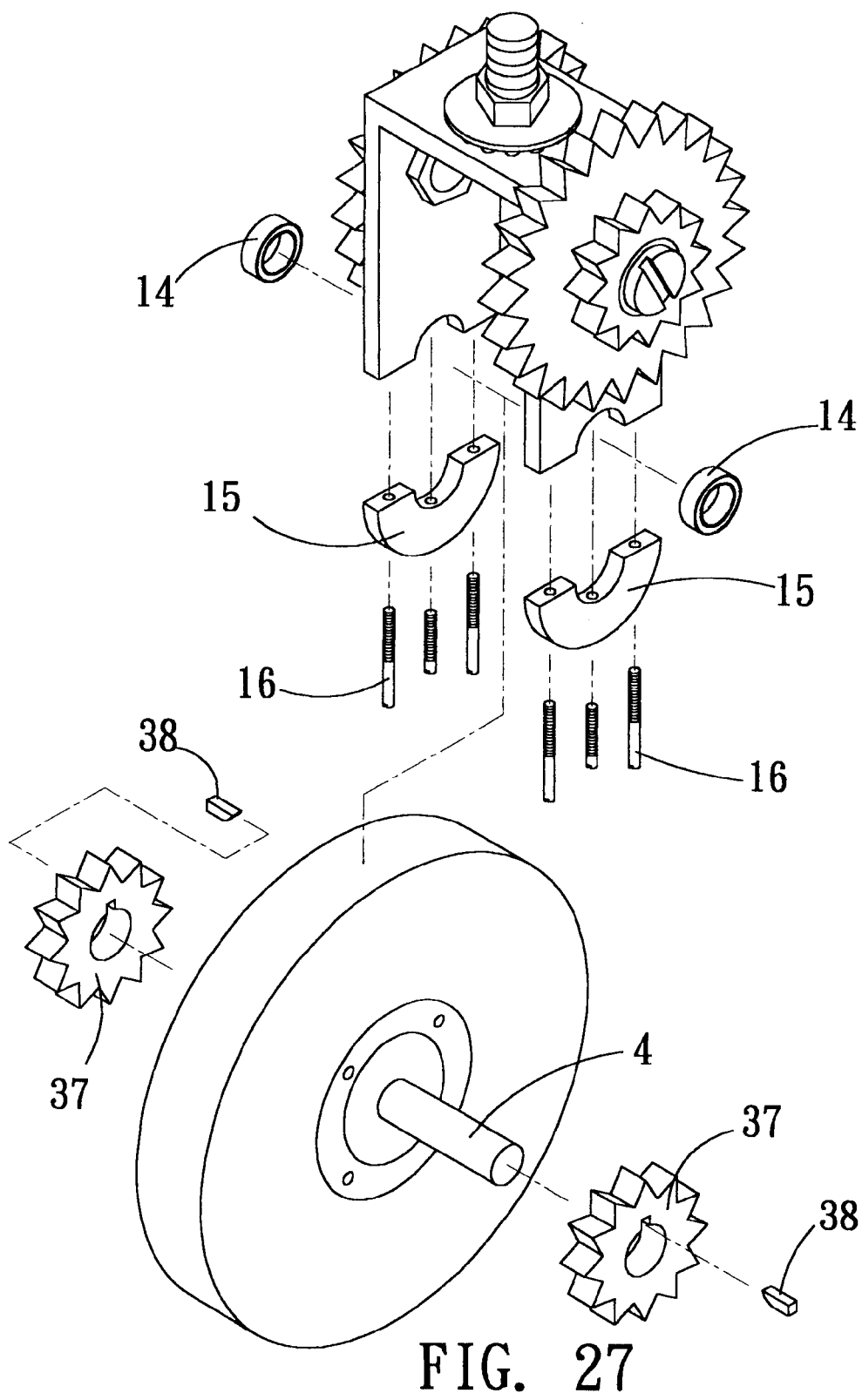
FIG. 27 is an exploded view of assembly of the wheel support, the wheel, and force-outputting gears of the invention.
Figure 28:
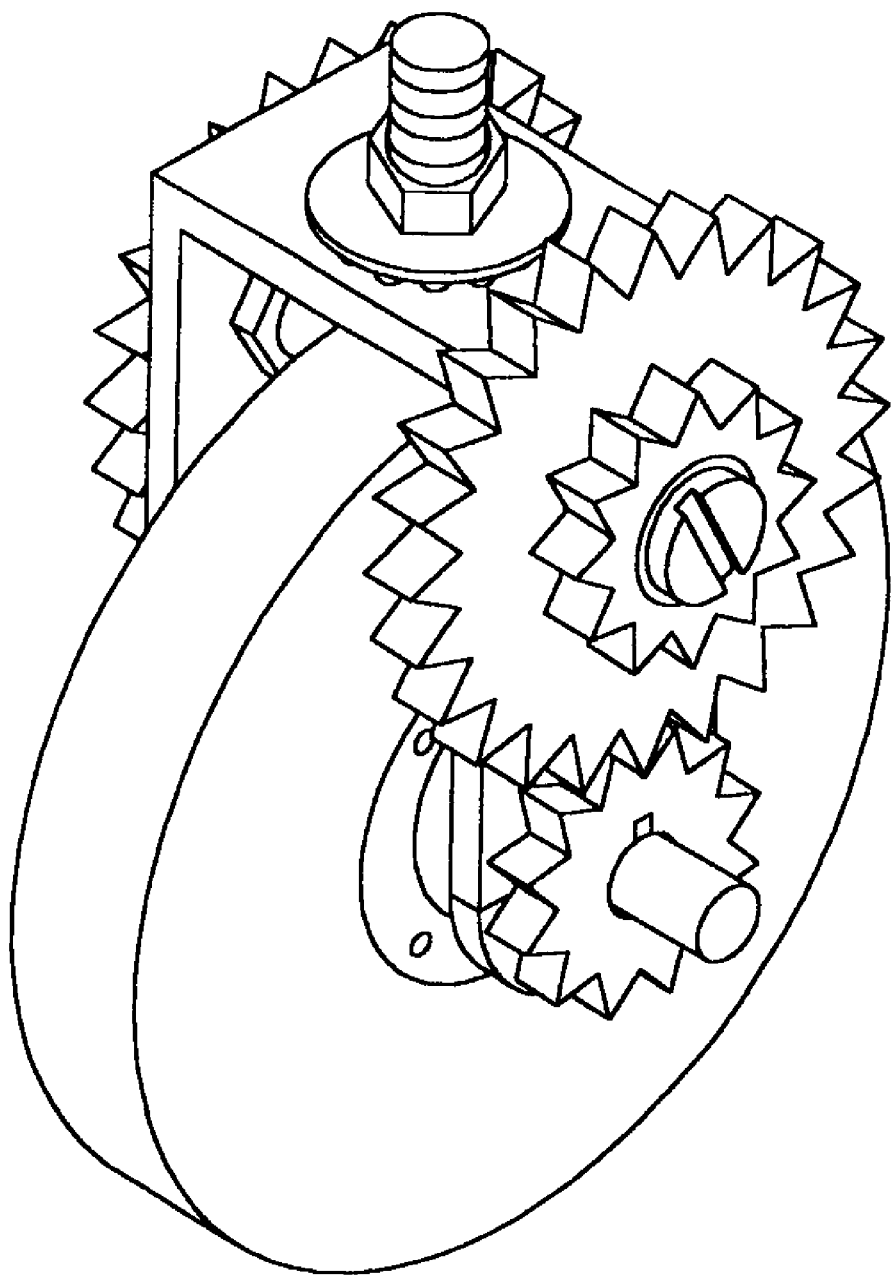
FIG. 28 is an assembled view of the assembly of the wheel support, the gears and the wheel of the invention.
Figure 29:
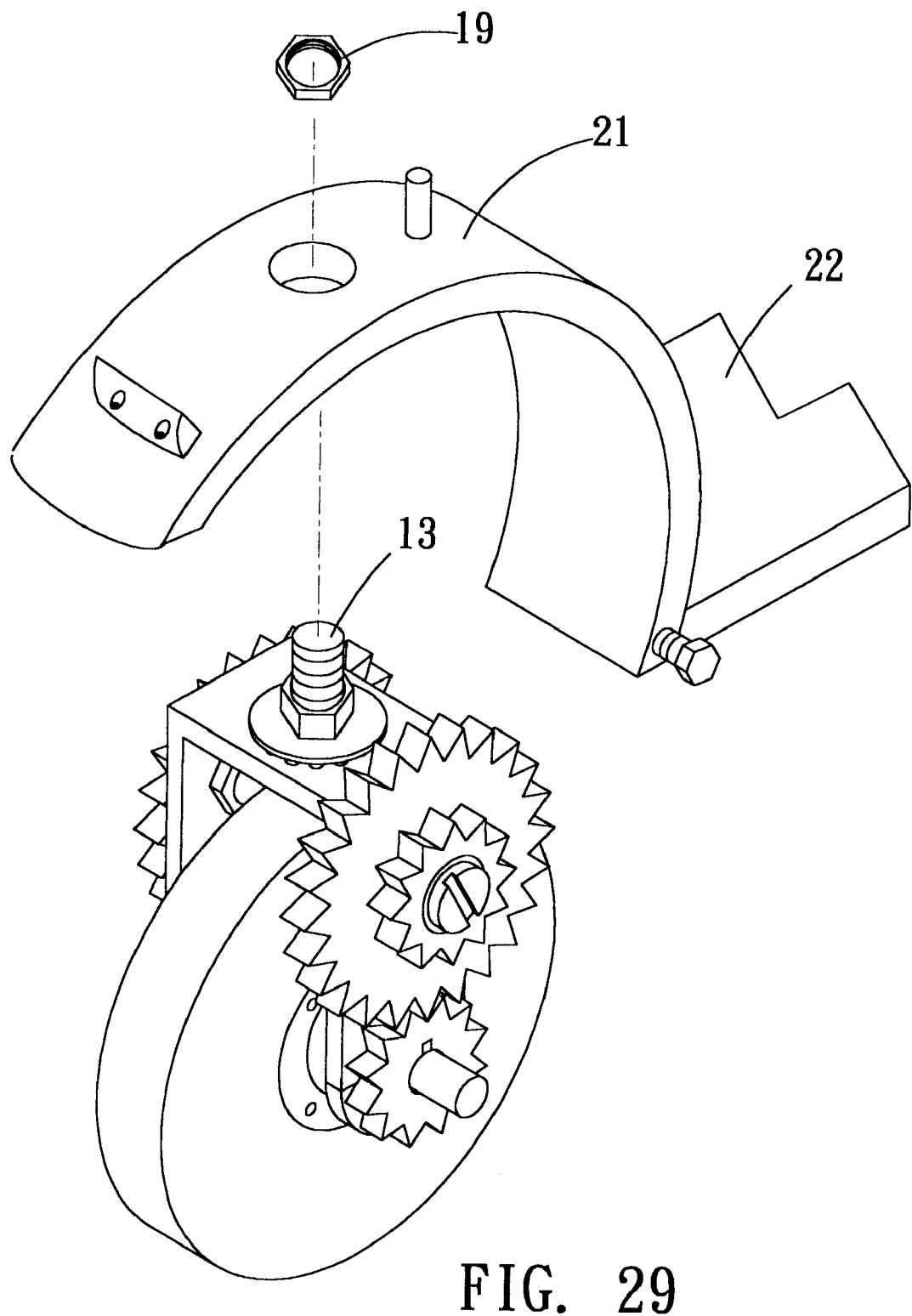
FIG. 29 is an exploded view of the assembled wheel and the assembled wheel cover plate and the platform of the mini scooter of the invention.
Figure 30:
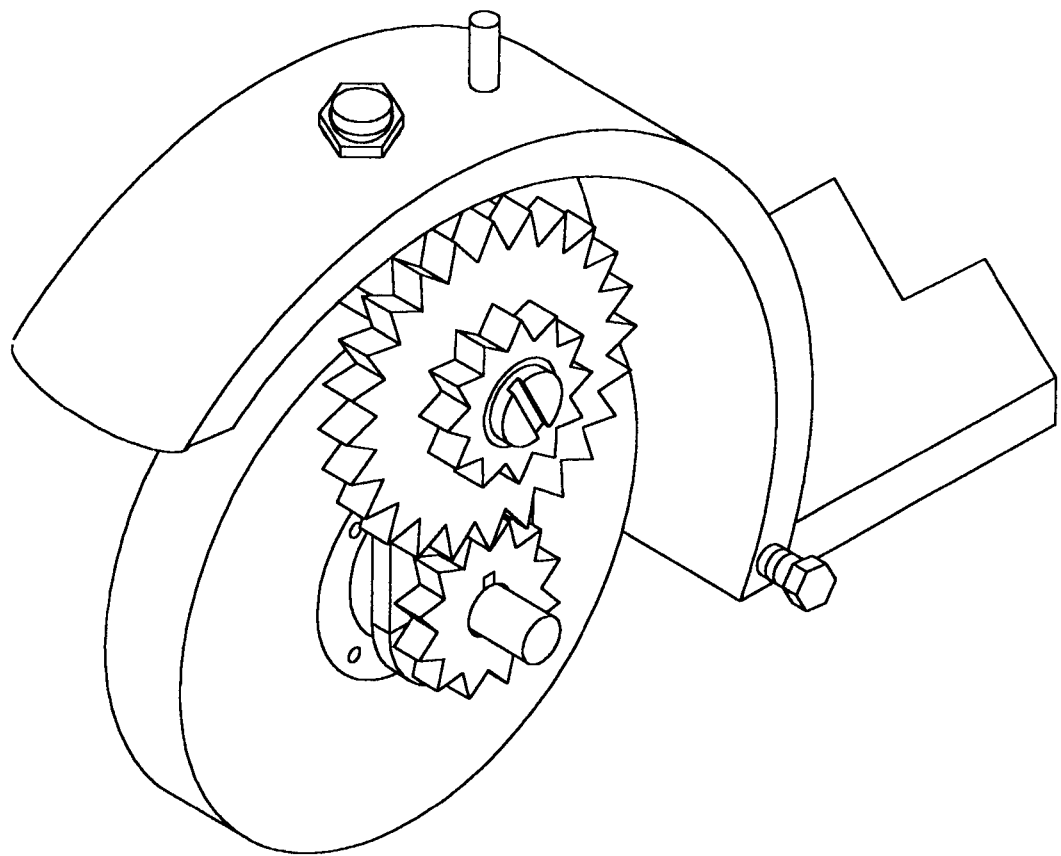
FIG. 30 is an assembled perspective view of the assembled wheel, the wheel cover plate and the platform of the mini scooter of the invention.
Figure 31:
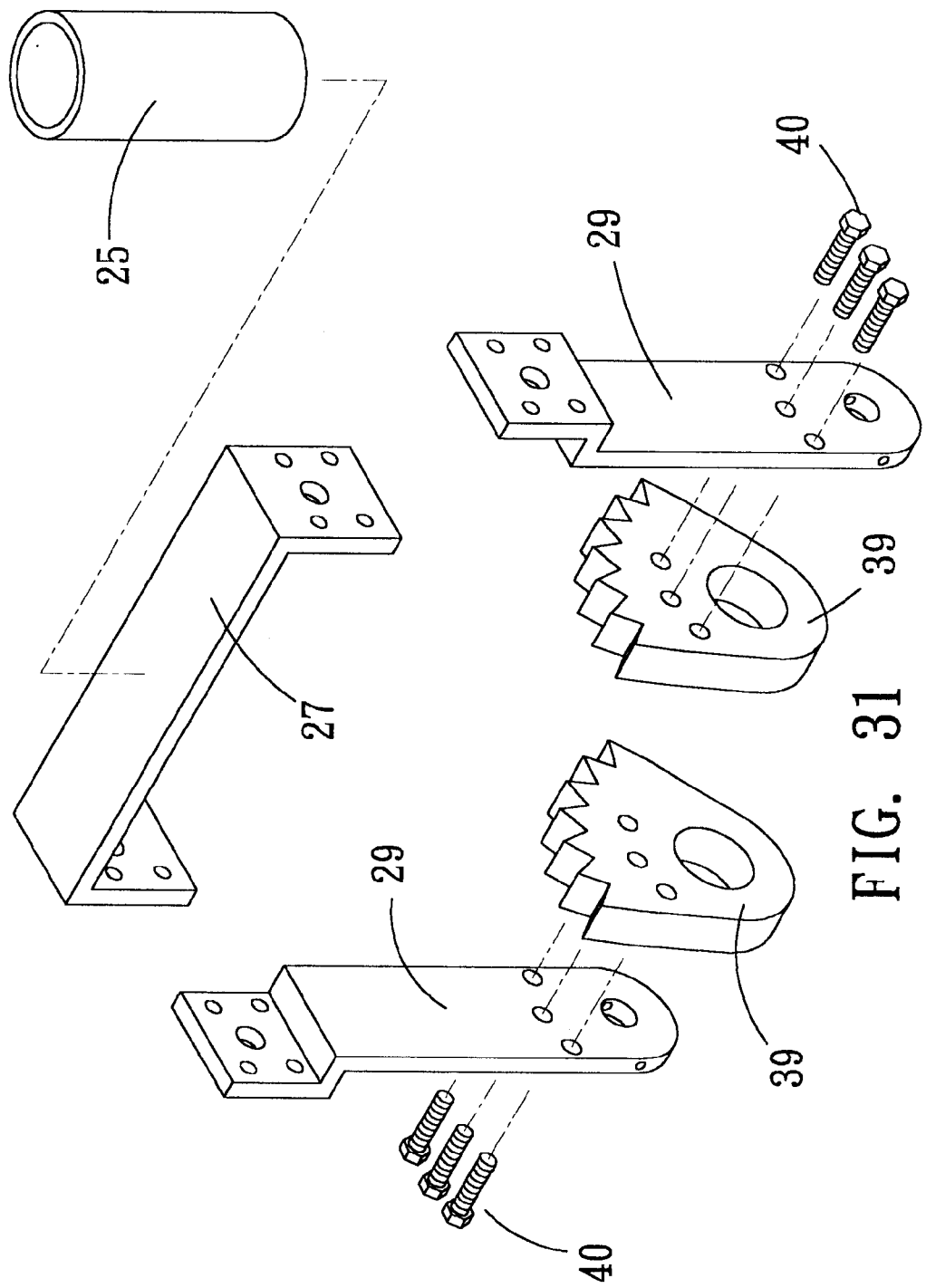
FIG. 31 is an exploded view of assembly of the steering rod support and force-inputting gears of the invention.
Figure 32:
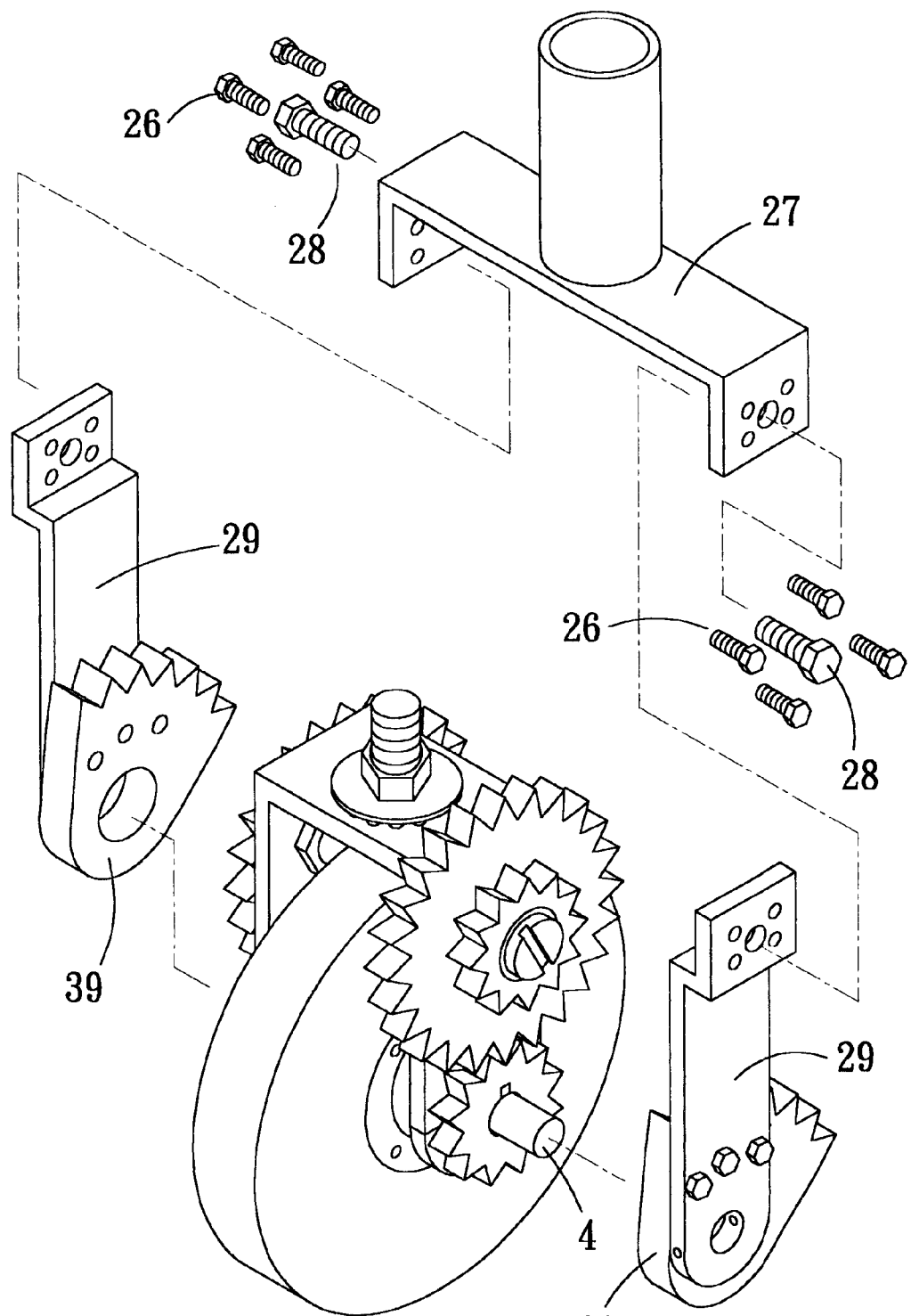
FIG. 32 is an exploded view of the assembled wheel, the steering rod support and the steering rod.
Figure 33:
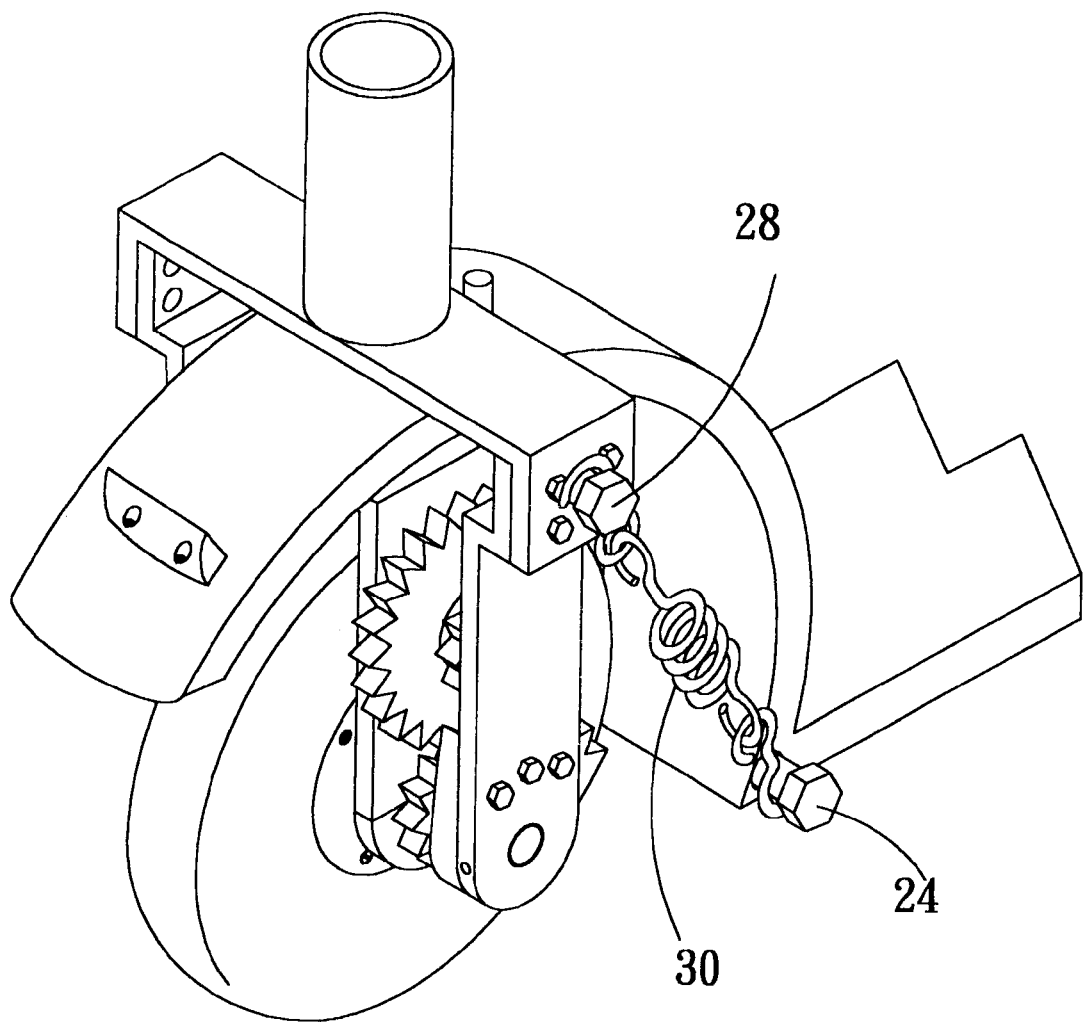
FIG. 33 is an assembled perspective view of a final assembly of the invention and additional speed change gears.
Figure 35:
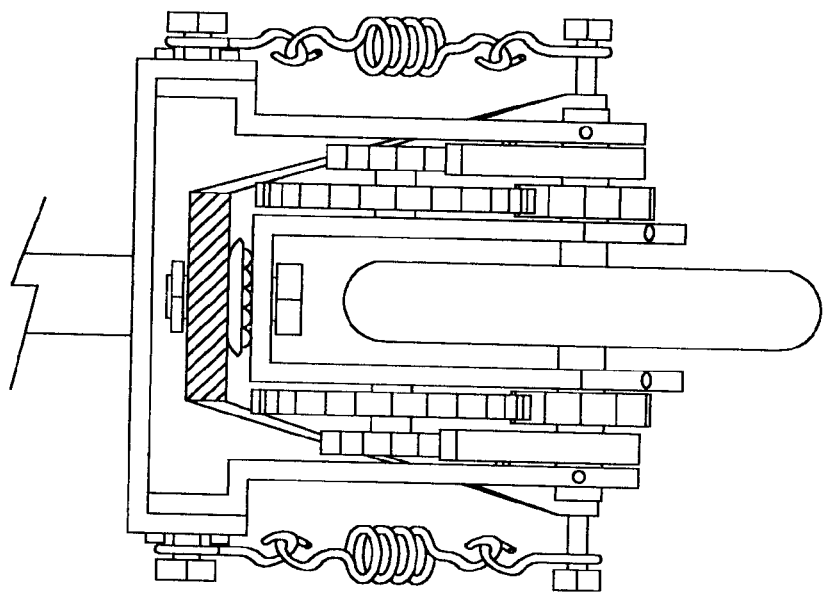
FIG. 35 is a front view of a final assembly of the invention and additional speed change gears.
Figure 34:
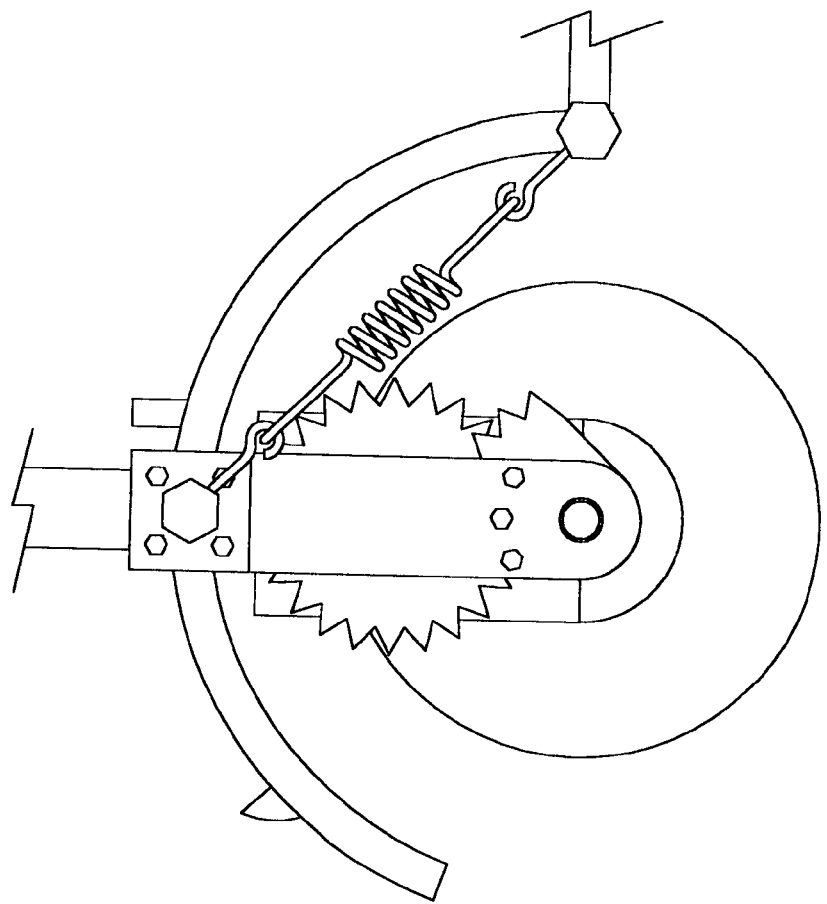
FIG. 34 is an assembled side view of a final assembly of the invention and additional speed change gears.

The invention utilizes the leftward and rightward rotation of the steering rod 25 to change direction of advancement of the wheel 3. The largest angle of the leftward and rightward rotation is determined by the size of the clearance formed when the wheel cover plate 21 abuts against the internal recesses of the steering rod supports 27, 29 during rotation of the latter (see FIGS. 21 and 25). The rotation of the steering rod 25 will generate certain predetermined force on the return springs 30 so as to facilitate restoration of the steering rod 25.

Figure 24:
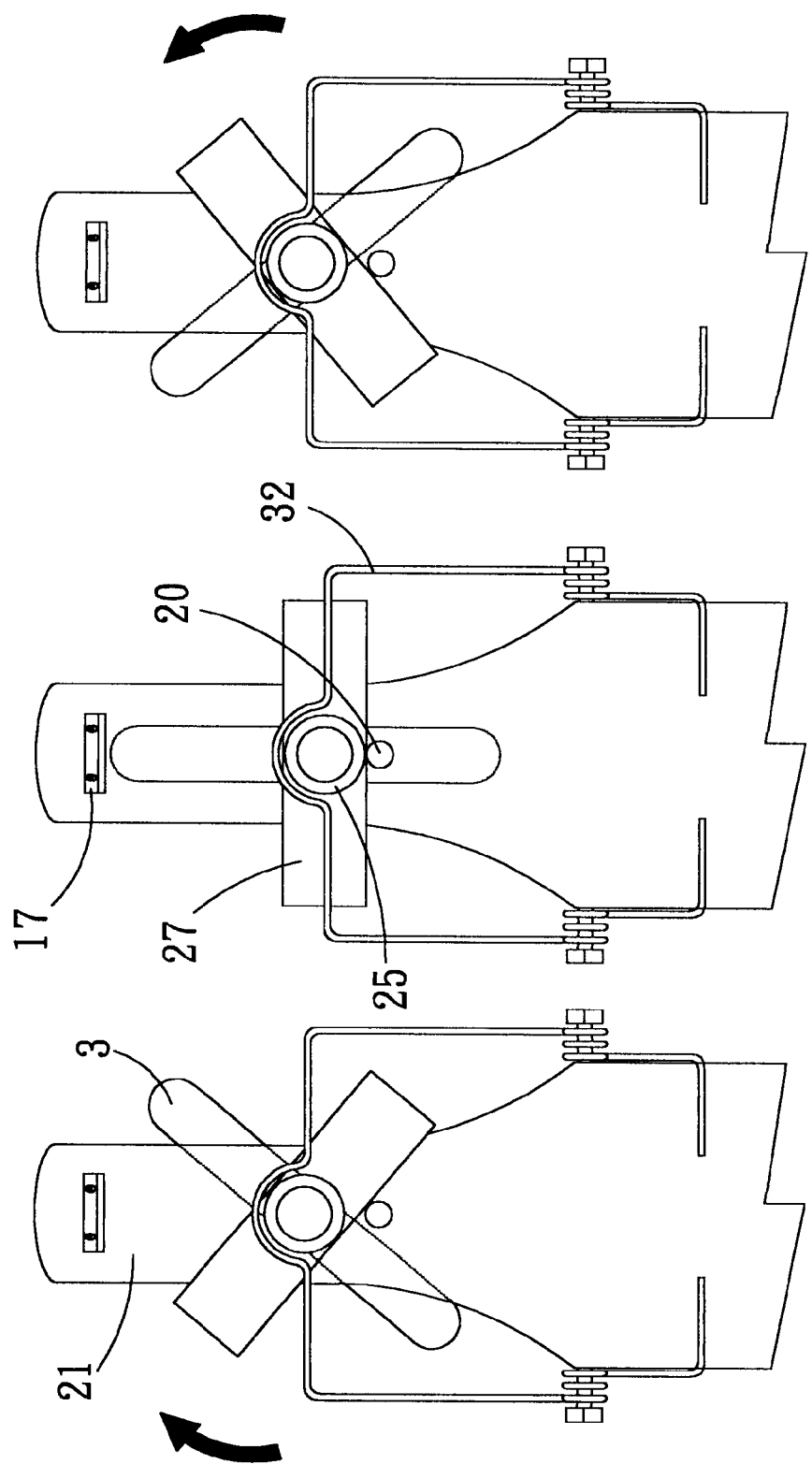
FIGS. 24A, 24B and 24C are schematic top views of the invention when the linking type return spring is employed to rotate the wheel.

As shown in FIG. 17, the lateral bottom portions of the wheel cover plate 2 are respectively provided with the securing bolts 24. A linking type return spring 32 (as shown in FIGS. 22, 23, 24A, 24B, 24C and 25) is wound around the steering rod 25. A spring portion of the linking type reset spring 32 is wound around the securing bolts 28 on the wheel cover plate 2. The two tail ends of the linking type reset spring 32 is fastened to and presses against the platform to generate a predetermined force. When the steering rod 25 swings forward, the linking type return spring 32 will be subjected to a force and will hence generate a greater predetermined force to facilitate the user to return the steering rod 25 to the position in front of the rear stop block 20 so as to facilitate the steering rod 25 to proceed with the next movement of driving the wheels of the mini scooter to rotate forward. When the steering rod 25 rotates left and right (as shown in FIG. 24), the linking type return spring 32 will not increase the predetermined force. The largest angle of the leftward and rightward rotation is determined by the size of the clearance formed when the wheel cover plate 21 abuts against the internal recesses of the steering rod supports 27, 29 during rotation of the latter As shown in FIGS. 26, 27, 28, 29, 30, 31, 32, 33, 34, 35 and 36, the lateral sides of the wheel support frame 12 respectively have through holes therein. Each of the through holes in either lateral side of the wheel support 12 accommodates a transmission gear bearing 33. The transmission gear bearing 33 has a transmission gear 34 fitted thereon. Through bolts 35 and nuts 36, the wheel support 12, the transmission gear bearing 33 and the transmission gear 34 are interconnected so that the transmission gear 34 can freely rotate on the wheel support 12 and will not slip therefrom. The two ends of the wheel axle 4 are respectively connected to force-outputting gears 37 via securing pins 38 such that the force-outputting gears 37 can rotate synchronously with the wheel axle. Force-inputting gears 39 area secured on the two steering rod side supports 29 via bolts 40 such that the force-inputting gears 39 and the steering rod side supports 29 can rotate synchronously on the wheel axle. The force-inputting gears 39 cooperate with the transmission gears 34. The transmission gears 34 cooperate with the force-outputting gears 37.

Figure 37:
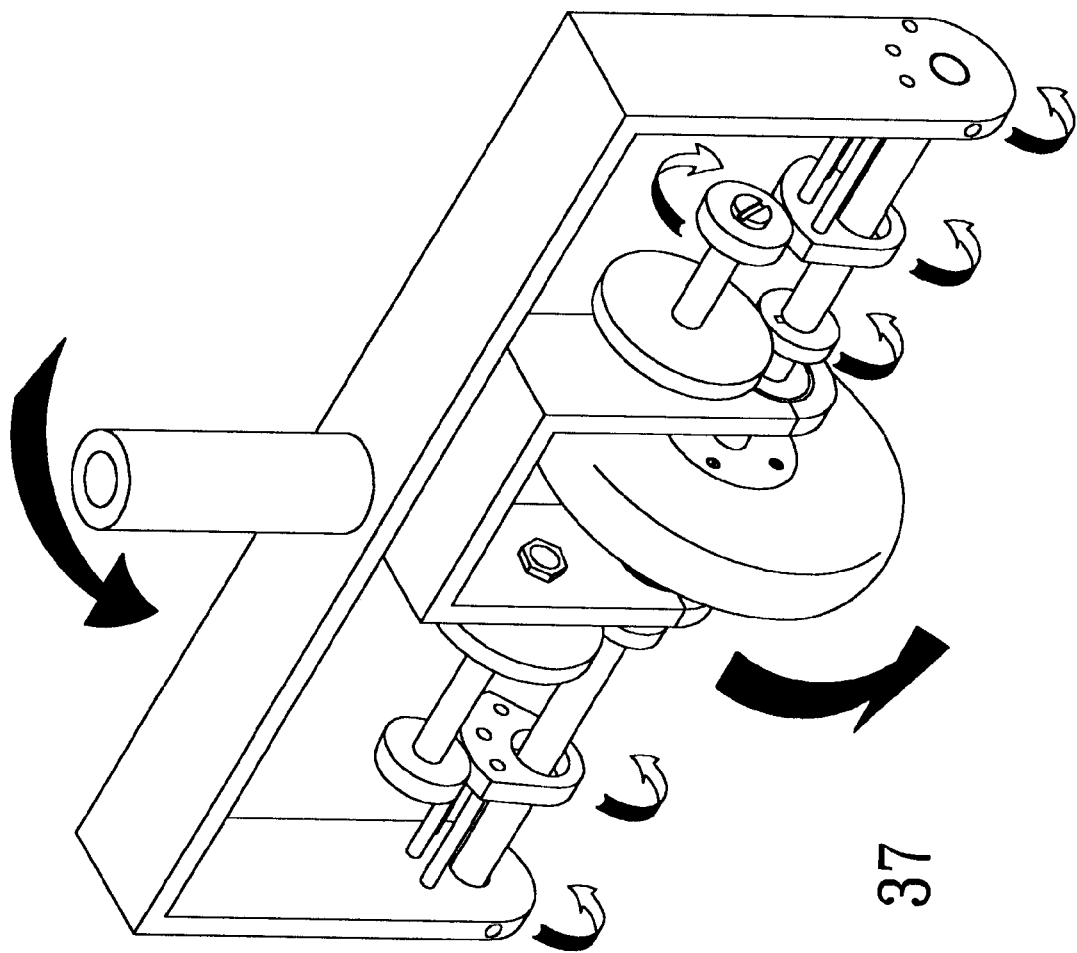
FIG. 37 is a schematic perspective view illustrating operation of the final assembly with the speed change gears, in which the relative distances are enlarged.

As shown in FIG. 37, the force-inputting gears 39, the transmission gears 34 and the force-outputting gears 37 are made of rubber or PU, and can be configured to have teeth or cylindrical and to be in tight contact with one another.

Figure 36:
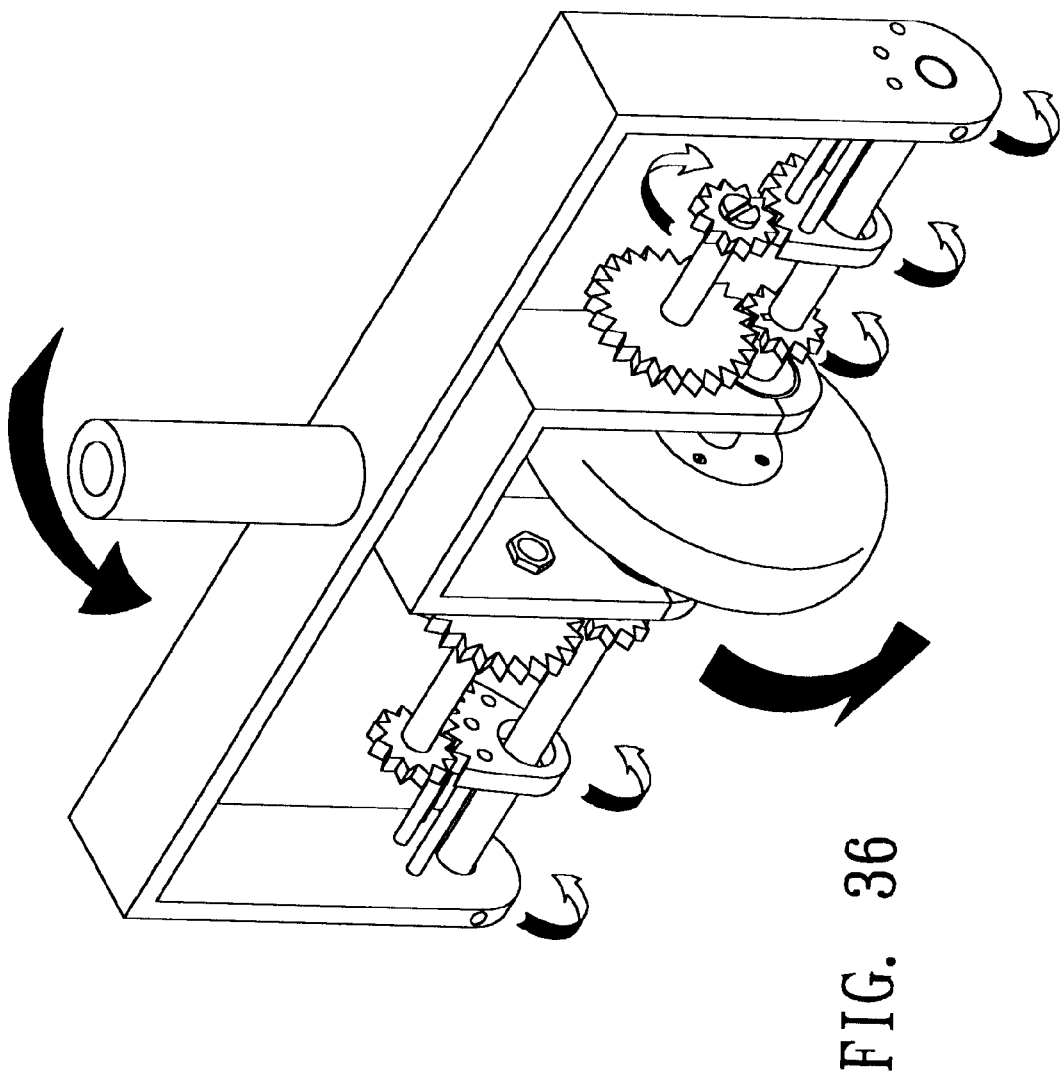
FIG. 36 is a schematic perspective view illustrating operation of the final assembly with the speed change gears, in which the relative distances are enlarged.

When the steering rod 25 swings forward and rearward in a reciprocating manner, the wheel axle 4 will freely rotate in loose fit holes in lower ends of the steering rod side supports 29. When gears are employed in the invention, the distances among relevant components are increased, and the operating directions are illustrated in an enlarged manner (as shown in FIG. 36). When a gear set is employed in the invention for transmission, since the size of the gears and the number of teeth of the gears are different, the sizes of the angles of forward and rearward swinging of the steering rod 25 relative to the rotational angle of the bearing pivot shaft 4 are increased or decreased. If the angles of forward and rearward swinging of the steering rod are increased via gear transmission, the rotation of the bearing pivot shaft 4 and the wheel 3 will become faster, but the swinging of the steering rod 25 will require a larger force. If the forward and rearward swinging angles of the steering rod are reduced via gear transmission, the rotation of the bearing pivot shaft 4 and the wheel 3 will become slower, but the swinging of the steering rod will require a smaller force.

The steering rod and the wheel cover plate can be made from aluminum alloys. The platform of the mini scooter can be made of aluminum alloy or engineering plastic. The wheel support, the steering rod support, the bearings, the return springs, the securing bolts, the wheel axle, and the transmission ring can be formed from alloy steel. The gears can be formed by powder metallurgy or engineering plastic to save processing expenses. If the gears are formed from rubber or PU, teeth can be eliminated to form cylindrical shapes. As long as the cylindrical gears can be in tight contact and achieve the object of speed change and transmission based upon the principle of friction. The distances among the relevant components are increased and the operating directions are indicated to illustrate the aforesaid configuration in an enlarged manner in FIG. 37. However, it is noted that the foregoing is intended to prove the practicality of the invention and is not intended to limit the practice of the invention.

Thus, by virtue of the invention, the mini scooter can advance via forward and rearward swinging of the steering rod without the need for foot pedaling. The steering rod can also be used to control direction of advancement. In other words, the user can control and steer movement of the mini scooter using the hands only.

Although the present invention has been illustrated and described with reference to the preferred embodiment thereof, it should be understood that it is in no way limited to the details of such embodiment but is capable of numerous modifications within the scope of the appended claims.

What is claimed is:

1. A mini scooter comprising: a wheel member, a wheel support member, a steering rod, a steering rod support, a wheel cover plate, and a platform, wherein:
   the wheel member includes a wheel with a transmission ring in the center, a unidirectional rotary bearing, a pivot shaft of said unidirectional rotary bearing serving as a wheel axle, two ends of said wheel axle being respectively provided with cover plates, said cover plates being further connected to said transmission ring;

said wheel support member including a wheel support with a top portion having a through hole and having an inverted U-shaped cross section, a securing bolt extending through said hole in said wheel support and engaging with a nut, two ends of said bearing pivot shaft being provided with axle bearings, two sides of said wheel support respectively forming circular holes for receiving said axle bearings;

said wheel cover plate being disposed on and secured to said securing bolt in said through hole in said wheel support, said wheel cover plate having a top portion provided with front and rear stop blocks, a rear end of said wheel cover plate being connected to said platform;

said steering rod support including a steering rod upper support and two steering rod side supports connected to two ends of said wheel axle and disposed on outer sides of said wheel support, two steering rod side supports being respectively connected to said steering rod upper support;

said steering rod being secured on a top portion of said steering rod upper support at a middle position such that when said steering rod swings forward and rearward, the swinging angles are limited within a range defined by said front and rear stop blocks.

2. The mini scooter as claimed in claim 1, wherein said cover plate and said transmission ring are connected via securing bolts.

3. The mini scooter as claimed in claim 1, wherein balls are provided between said through hole in said wheel support and said securing bolt, and a ball cover plate is fitted on said securing bolt, is disposed on an upper end of said wheel support, and has said securing bolt extending therethrough for engagement with said nut.

4. The mini scooter as claimed in claim 1, wherein said wheel support has curved recesses at two lateral bottom portions thereof, securing plates with curved recesses being secured to the lateral bottom portions of said wheel support via securing bolts, said curved recesses of said wheel support and said curved recesses of said securing plates forming said circular holes for receiving said axle bearings.

5. The mini scooter as claimed in claim 1, wherein said steering rod side supports and said steering rod upper support are connected via bolts.

6. The mini scooter as claimed in claim 1, wherein said bearing pivot shaft has middle portion with an outer side provided with a recess, the recess receives a rotary pin.

7. The mini scooter as claimed in claim 1, wherein said bearing pivot shaft has a middle portion with an outer side provided with a groove, said groove accommodating a spring and a braking plate therein, said transmission ring having a serrated groove.

8. The mini scooter as claimed in claim 1, wherein two sides of said steering rod upper support and two lateral bottom portions of said wheel cover plate are respectively provided with securing bolts, two connecting type return springs respectively engaging and pulling said securing bolts on the two sides of said steering rod upper support and said securing bolts on the lateral bottom sides of said wheel cover plate such that when said steering rod swings forward, said connecting type return springs provide a rearward pulling predetermined force.

9. The mini scooter as claimed in claim 1, wherein two lateral bottom portions of said wheel cover plate are respectively provided with securing bolts, a linking return spring winding around said steering rod, a spring portion of said linking return spring winding around said securing bolt on said wheel cover plate, two tail ends of said linking return spring fastening and pressing said platform to generate a predetermined force such that, when said steering rod swings forward, said linking return spring will be subjected to a force and will hence generate a predetermined force, and when said steering rod rotates leftward and rightward, said linking return spring will not increase the predetermined force, and the largest angles of the leftward and rightward rotation will be determined by the size of clearance when said wheel cover plate abuts against internal groove of said steering rod support when the latter rotates.

10. The mini scooter as claimed in claim 1, wherein two lateral sides of said wheel support are respectively provided with through holes, said through holes respectively accommodating transmission gear bearings, said transmission gear bearing being fitted with a transmission gear, said wheel support, said transmission gear bearing and said transmission gear being interconnected via bolts and nuts, two ends of said wheel axle being respectively connected to force-outputting gears via securing pins, force-inputting gears being secured on said two steering rod side supports via bolts, said force-inputting gears cooperating with said transmission gears, said transmission gears cooperating with said force-outputting gears.

11. The mini scooter as claimed in claim 10, wherein said force-inputting gears, said transmission gears and said force-outputting gears are formed from a plastic material and are configured to have teeth or to be cylindrical and in tight contact.

* * * * *